US012579934B2

(12) United States Patent
Zhang et al.

(10) Patent No.: US 12,579,934 B2
(45) Date of Patent: Mar. 17, 2026

(54) DISPLAY COMPATIBLE AMBIENT LIGHT SENSOR

(71) Applicant: QUALCOMM Incorporated, San Diego, CA (US)

(72) Inventors: Nan Zhang, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/860,826

(22) PCT Filed: Jun. 28, 2022

(86) PCT No.: PCT/CN2022/101771
§ 371 (c)(1),
(2) Date: Oct. 28, 2024

(87) PCT Pub. No.: WO2024/000143
PCT Pub. Date: Jan. 4, 2024

(65) Prior Publication Data
US 2025/0292729 A1      Sep. 18, 2025

(51) Int. Cl.
*G09G 3/3208*          (2016.01)
*G01J 1/42*            (2006.01)

(52) U.S. Cl.
CPC .......... *G09G 3/3208* (2013.01); *G01J 1/4204* (2013.01); *G09G 2310/08* (2013.01);
(Continued)

(58) Field of Classification Search
CPC ........ G01J 1/4204; G01J 1/4209; G09G 3/30; G09G 3/32; G09G 3/3208; G09G 3/3216;
(Continued)

(56) References Cited

U.S. PATENT DOCUMENTS

| | | | |
|---|---|---|---|
| 2010/0245309 | A1 | 9/2010 | Matsuki |
| 2012/0200225 | A1 | 8/2012 | Sawada |

(Continued)

FOREIGN PATENT DOCUMENTS

| | | |
|---|---|---|
| CN | 107945747 A | 4/2018 |
| CN | 107990978 A | 5/2018 |

(Continued)

OTHER PUBLICATIONS

International Search Report and Written Opinion—PCT/CN2022/101771—ISA/EPO—Mar. 8, 2023.
(Continued)

*Primary Examiner* — Ke Xiao
*Assistant Examiner* — Nelson Lam
(74) *Attorney, Agent, or Firm* — QUALCOMM Incorporated

(57)          ABSTRACT

A user equipment comprising a display device, a light sensor, and a timing controller configured to provide one or more timing signals to (1) enable the light sensor to sense ambient light during a first portion of a repeated timing pattern and (2) enable one or more light emitters to emit display light during a second portion of the repeated timing pattern, wherein the first portion does not substantially overlap with the second portion, wherein the timing controller is configured to adjust a duty cycle for sensing ambient light within the repeated timing pattern and a duty cycle for emitting display light within the repeated timing pattern, in response to an ambient light intensity measurement based on one or more readings of the light sensor.

28 Claims, 16 Drawing Sheets

(52) U.S. Cl.
CPC .............. *G09G 2320/0626* (2013.01); *G09G 2320/0666* (2013.01); *G09G 2360/144* (2013.01); *G09G 2360/16* (2013.01)

(58) Field of Classification Search
CPC .. G09G 3/3225; G09G 3/3233; G09G 3/3241; G09G 3/325; G09G 2360/142; G09G 2360/144; G09G 2360/145; G09G 2360/147; G09G 2360/148
USPC ....................................................... 345/76–83
See application file for complete search history.

(56) References Cited

U.S. PATENT DOCUMENTS

| | | | | |
|---|---|---|---|---|
| 2015/0379941 | A1* | 12/2015 | Satake ................. | G09G 3/2003 345/82 |
| 2017/0221450 | A1* | 8/2017 | Kim ...................... | G06F 1/1637 |
| 2017/0229059 | A1* | 8/2017 | Bonnier .................. | G06F 3/017 |
| 2018/0348049 | A1* | 12/2018 | Yoon ..................... | G09G 3/3406 |
| 2020/0242985 | A1* | 7/2020 | Cho ....................... | G06F 1/1637 |
| 2021/0233493 | A1 | 7/2021 | Raynor | |
| 2023/0169903 | A1* | 6/2023 | Kim ..................... | G09G 3/3406 345/207 |
| 2024/0029667 | A1* | 1/2024 | Shin .................. | H04M 1/72454 |

FOREIGN PATENT DOCUMENTS

| | | | |
|---|---|---|---|
| CN | 109859720 | A | 6/2019 |
| WO | WO-2022030736 | A1 | 2/2022 |

OTHER PUBLICATIONS

Supplementary Partial European Search Report—EP22948266—Search Authority—Munich—Jan. 29, 2026.

* cited by examiner

100

300

400

600

700

800

1200

1204

Green Axis

Red Axis

1202

Blue Axis

1206

1302

| Display Duty Cycle | Color Calibration Parameter |
| --- | --- |
| 20% | 0 |
| 50% | 1 |
| 70% | 2 |

| Display Duty Cycle Range | Color Calibration Parameter |
| --- | --- |
| 0%-35% | 0 |
| 35%-65% | 1 |
| 65%-100% | 2 |

| Display Duty Cycle | Brightness Adjustment Ratio |
|---|---|
| 20% | 3 |
| 50% | 2 |
| 70% | 0.8 |

| Display Duty Cycle Range | Brightness Adjustment Ratio |
|---|---|
| 0%-35% | 3 |
| 35%-65% | 2 |
| 65%-100% | 0.8 |

FIG. 14B

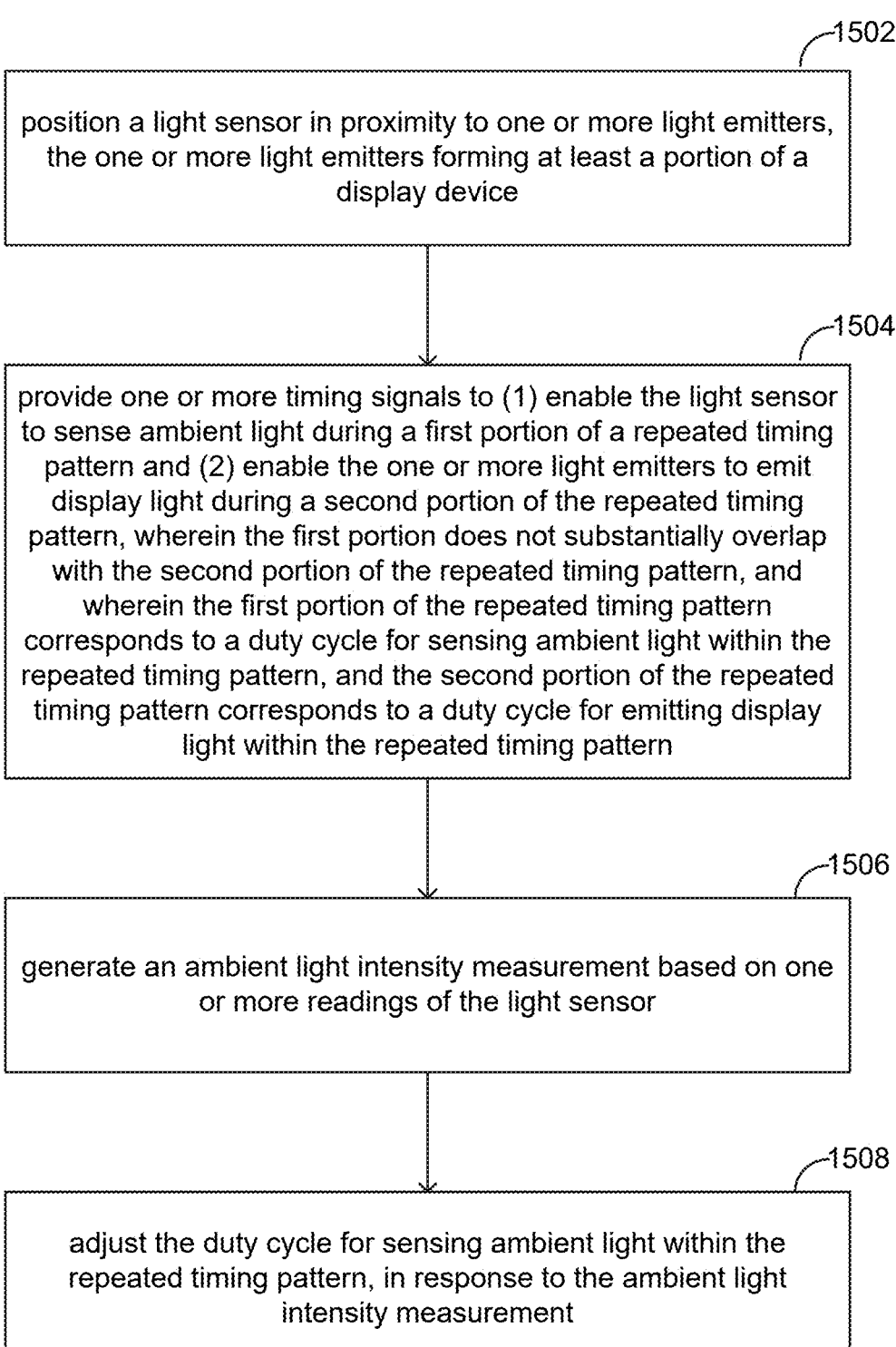

1502 position a light sensor in proximity to one or more light emitters, the one or more light emitters forming at least a portion of a display device

1504 provide one or more timing signals to (1) enable the light sensor to sense ambient light during a first portion of a repeated timing pattern and (2) enable the one or more light emitters to emit display light during a second portion of the repeated timing pattern, wherein the first portion does not substantially overlap with the second portion of the repeated timing pattern, and wherein the first portion of the repeated timing pattern corresponds to a duty cycle for sensing ambient light within the repeated timing pattern, and the second portion of the repeated timing pattern corresponds to a duty cycle for emitting display light within the repeated timing pattern

1506 generate an ambient light intensity measurement based on one or more readings of the light sensor

1508 adjust the duty cycle for sensing ambient light within the repeated timing pattern, in response to the ambient light intensity measurement

FIG. 15

DISPLAY COMPATIBLE AMBIENT LIGHT SENSOR

RELATED APPLICATIONS

This application is a National Phase entry of International Application No. PCT/CN2022/101771, filed Jun. 28, 2022, entitled "DISPLAY COMPATIBLE AMBIENT LIGHT SENSOR", which is assigned to the assignee hereof, and incorporated herein in its entirety by reference.

BACKGROUND

Field of Disclosure

Aspects of the disclosure relate generally to ambient light sensing. More specifically, aspects discussed below relate to ambient light sensing in conjunction with display device operation.

Ambient light sensors (ALS) are widely used in user devices such as smartphones, notebooks, wearable devices, automotive displays, television displays, among other devices. An ambient light sensor provides measurements that indicate the intensity of ambient light of an environment of a user device. Ambient light sensor readings have many applications, such as dynamic brightness adjustment for displays, location and/or context determination (e.g., indoor vs. outdoor), among other uses. Oftentimes, an ALS is implemented in conjunction with a display device, such as an organic light-emitting diode (OLED) display, a light-emitting diode (LED) display, a liquid crystal display (LCD) display, etc. Readings from the ALS may be used to dynamically adjust the brightness of the OLED display or LED display, or the backlight of the LCD display. Given the usefulness of ALS readings in conjunction with display device operation, improvements in the accuracy and availability of light intensity readings obtained from an ALS device in the presence of a display device are particularly needed.

BRIEF SUMMARY

A brief summary is presented below of one or more aspects of the present disclosure. The summary is not an extensive description of all features and not intended to identify key or critical elements of all aspects of the disclosure. Instead, the summary is intended to provide some concepts of one or more related concepts as a prelude to the more detailed description that is presented in subsequent sections.

An example user equipment comprises a display device, the display device comprising one or more light emitters forming at least a portion of the display device; a light sensor positioned such that an optical path exists between the light sensor and the one or more light emitters; and a timing controller coupled to the light sensor and the display device, the timing controller configured to provide one or more timing signals to (1) enable the light sensor to sense ambient light during a first portion of a repeated timing pattern and (2) enable the one or more light emitters to emit display light during a second portion of the repeated timing pattern, wherein the first portion does not substantially overlap with the second portion of the repeated timing pattern, wherein the first portion of the repeated timing pattern corresponds to a duty cycle for sensing ambient light within the repeated timing pattern, and the second portion of the repeated timing pattern corresponds to a duty cycle for emitting display light within the repeated timing pattern, wherein the timing controller is configured to adjust the duty cycle for sensing ambient light within the repeated timing pattern and the duty cycle for emitting display light within the repeated timing pattern, in response to an ambient light intensity measurement based on one or more readings of the light sensor, and wherein the timing controller is configured to continue to provide the one or more timing signals after adjusting the duty cycle for sensing ambient light within the repeated timing pattern.

An example method of sensing ambient light intensity in a user equipment comprising a display device and a light sensor positioned such that an optical path exists between the light sensor and one or more light emitters forming at least a portion of the display device, according to this disclosure, may comprise providing one or more timing signals to (1) enable the light sensor to sense ambient light during a first portion of a repeated timing pattern and (2) enable the one or more light emitters to emit display light during a second portion of the repeated timing pattern, wherein the first portion does not substantially overlap with the second portion of the repeated timing pattern, and wherein the first portion of the repeated timing pattern corresponds to a duty cycle for sensing ambient light within the repeated timing pattern, and the second portion of the repeated timing pattern corresponds to a duty cycle for emitting display light within the repeated timing pattern. The method also may comprise generating an ambient light intensity measurement based on one or more readings of the light sensor. The method also may comprise adjusting the duty cycle for sensing ambient light within the repeated timing pattern and the duty cycle for emitting display light within the repeated timing pattern, in response to the ambient light intensity measurement. The method also may comprise continuing to provide the one or more timing signals after adjusting the duty cycle for sensing ambient light within the repeated timing pattern.

According to this disclosure, an example non-transitory computer-readable medium having instructions embedded thereon, which when executed by one or more processors, cause the one or more processors to perform functions comprising provide one or more timing signals to (1) enable a light sensor to sense ambient light during a first portion of a repeated timing pattern and (2) enable one or more light emitters to emit display light during a second portion of the repeated timing pattern, wherein the light sensor is positioned such that an optical path exists between the light sensor and the one or more light emitters, and wherein the first portion of the repeated timing pattern does not substantially overlap with the second portion of the repeated timing pattern, and wherein the first portion of the repeated timing pattern corresponds to a duty cycle for sensing ambient light within the repeated timing pattern, and the second portion of the repeated timing pattern corresponds to a duty cycle for emitting display light within the repeated timing pattern. The instructions further may comprise code for generate an ambient light intensity measurement based on one or more readings of the light sensor. The instructions further may comprise code for adjust the duty cycle for sensing ambient light within the repeated timing pattern, in response to the ambient light intensity measurement. The instructions further may comprise code for continue to provide the one or more timing signals after adjusting the duty cycle for sensing ambient light within the repeated timing pattern.

An example computerized apparatus comprising: means for providing one or more timing signals to (1) enable a light sensor to sense ambient light during a first portion of a repeated timing pattern and (2) enable one or more light emitters to emit display light during a second portion of the repeated timing pattern, wherein the light sensor is positioned such that an optical path exists between the light sensor and the one or more light emitters, and wherein the first portion does not substantially overlap with the second portion of the repeated timing pattern, and wherein the first portion of the repeated timing pattern corresponds to a duty cycle for sensing ambient light within the repeated timing pattern, and the second portion of the repeated timing pattern corresponds to a duty cycle for emitting display light within the repeated timing pattern, means for generating an ambient light intensity measurement based on one or more readings of the light sensor, means for adjusting the duty cycle for sensing ambient light within the repeated timing pattern, in response to the ambient light intensity measurement, means for continuing to provide the one or more timing signals after adjusting the duty cycle for sensing ambient light within the repeated timing pattern.

BRIEF DESCRIPTION OF THE DRAWINGS

Aspects of the disclosure are illustrated by way of example. In the accompanying figures, like reference numbers indicate similar elements.

FIG. 13A illustrates examples of different display duty cycles and their corresponding color calibration parameters.

FIG. 13B illustrates examples of different display duty cycle ranges and their corresponding color calibration parameters.

FIG. 14A illustrates examples of different display duty cycles and their corresponding brightness level adjustment ratio.

FIG. 14B illustrates examples of different display duty cycle ranges and their corresponding brightness adjustment ratios.

FIG. 15 is a flow chart showing examples of steps performed in a technique for sensing ambient light intensity while presenting display content, according to an aspect of the disclosure.

DETAILED DESCRIPTION

Figure 1:
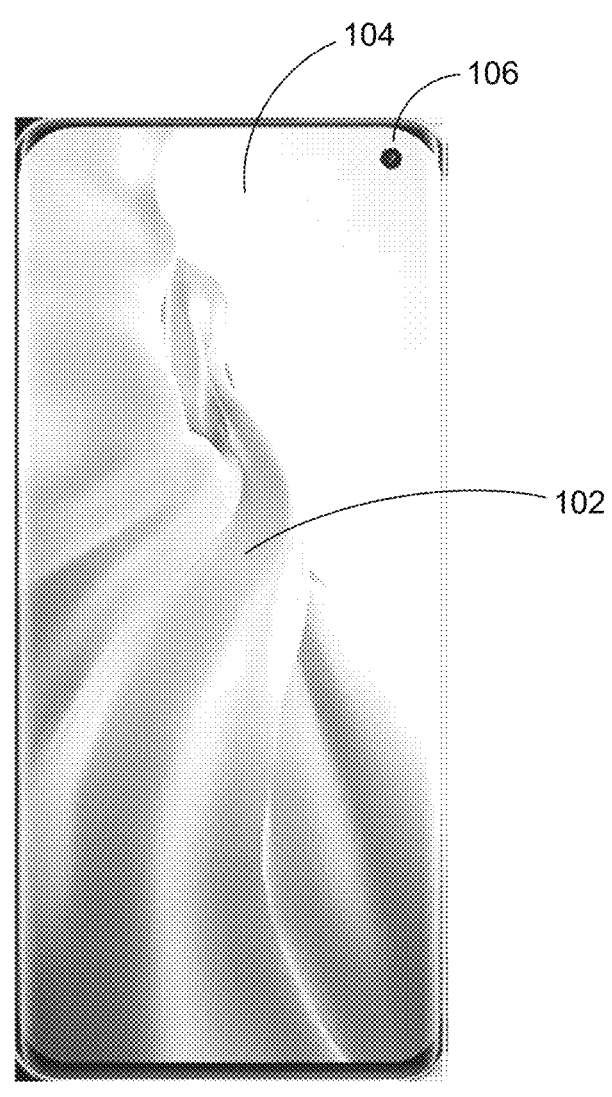
FIG. 1 illustrates an efficient approach to improving the accuracy of light intensity readings generated by an ALS device used in conjunction with a display device, according to an aspect of the disclosure.

Several illustrative aspects will now be described with respect to the accompanying drawings, which form a part hereof. While particular aspects, in which one or more aspects of the disclosure may be implemented, are described below, other aspects may be used and various modifications may be made without departing from the scope of the disclosure or the spirit of the appended claims.

As mentioned previously, ALS readings are often obtained in conjunction with operation of a display device. In many implementations, the ALS device may be located in proximity to the display device. As an example of such proximity, the ALS device may be positioned such that an optical path exist between the ALS device and one or more light emitters that form at least part of the display device. The optical path may include direct optical path(s), reflected optical path(s), or a combination thereof. The optical path may travel through different materials, over different boundaries, etc. The existence of such an optical path allows display light to reach the ALS device. One significant drawback of such proximity is that light emitted from the display device can be inadvertently captured by the ALS device and thus pollute ALS readings. Specifically, in addition to the photons of light coming from the environment, the ALS device may also capture additional photons emitted from the display device. The capture of such additional photons attributed to display light can cause a positive bias in the ALS reading—indicating a level of light intensity higher than the true ambient light intensity. The positive bias is also time-varying and difficult to predict. This is because the amount of light emitted from the display is typically not constant; it changes depending on the ever-changing display content being presented by the display device.

One approach to improving the accuracy of light intensity readings generated by an ALS device used in conjunction with a display device is to position the ALS device away from any light emitting sources of the display device. An example of such an approach is the adoption of a display panel having a "notch" design. Such a display panel lacks any light emitting elements (e.g., OLED pixels) in the notch area. An ALS device may be positioned within the notch area, thereby ensuring that the ALS device is separated by a minimum distance from any light emitting elements. The larger the notch area, the more separation that can be guaranteed between the ALS device and any light emission. The positive bias in the ALS reading attributed to light emission from the display device is thus reduced. While this approach can improve the accuracy of the ALS reading, the presence of the notch area reduces the useful display area of the display device and introduces an element to the to the overall appearance of the display of user device that is not necessarily aesthetic pleasing.

Another approach to improving the accuracy of light intensity readings generated by an ALS device used in conjunction with a display device is to position the ALS device beneath the display panel and apply run-time calibration/compensation to the obtained the ALS measurement, by taking into account the current display content. With knowledge of the display content presented in each frame of display data, an estimate can be made of the positive bias in the ALS measurement caused the additional photons emitted from the display device. The estimate of the positive bias can then be used in run-time calibration/compensation to adjust the ALS measurement, in order to remove the positive bias. However, such run-time calibration/compensation can be costly in terms of compute, memory, and power resources. Large amounts of display frame content may need to be to dumped memory in real-time, which requires a significant amount of power. Even if the memory dump is performed in hardware, software running in a processor such as a system-on-a-chip (SOC) may be needed to control the hardware for the large memory transfers. Furthermore, the calibration/compensation algorithm used for estimating and cancelling the positive bias can be complex, taking into account the large amount of display frame content and predicting the impact of the display frame content on the ALS measurement.

Aspects of the present disclosure provide an efficient approach to improving the accuracy of light intensity while allowing ALS device to be positioned in proximity to light emitting elements of the display panel—e.g., placing the ALS device beneath the display panel. This approach avoids the significant compute, memory, and power costs associated with performing run-time calibration/compensation of the ALS measurement that takes into account display frame content. At the same time, the benefits of the improved aesthetic of a display panel without a "notch" area can be realized.

FIG. 1 illustrates an efficient approach to improving the accuracy of light intensity readings generated by an ALS device used in conjunction with a display device, according to an aspect of the disclosure. A frontside view of a user device 100 is presented. In this example, user device 100 is a smartphone. However, the techniques discussed herein are not limited to use in a smartphone device. Other types of user devices, such as notebooks, wearable devices, automotive displays, television displays, among other devices, can implement the described techniques and components in accordance with aspects of the present disclosure. As shown in FIG. 1, the user device 100 comprises a display device, which includes a display panel 102 presenting display content. An ALS device 104 is positioned beneath the display panel 102 and therefore not visible in FIG. 1. The user sees only the content being displayed on the display panel 102 and not the ALS device 104. This arrangement increases the display area of the display device and provides an aesthetically pleasing appearance for the user device 100. Also shown in FIG. 1 is an optional frontside camera 106. In this example, a small opening is introduced in the display panel 102 for image capture by the optional frontside camera 106.

Figure 2:
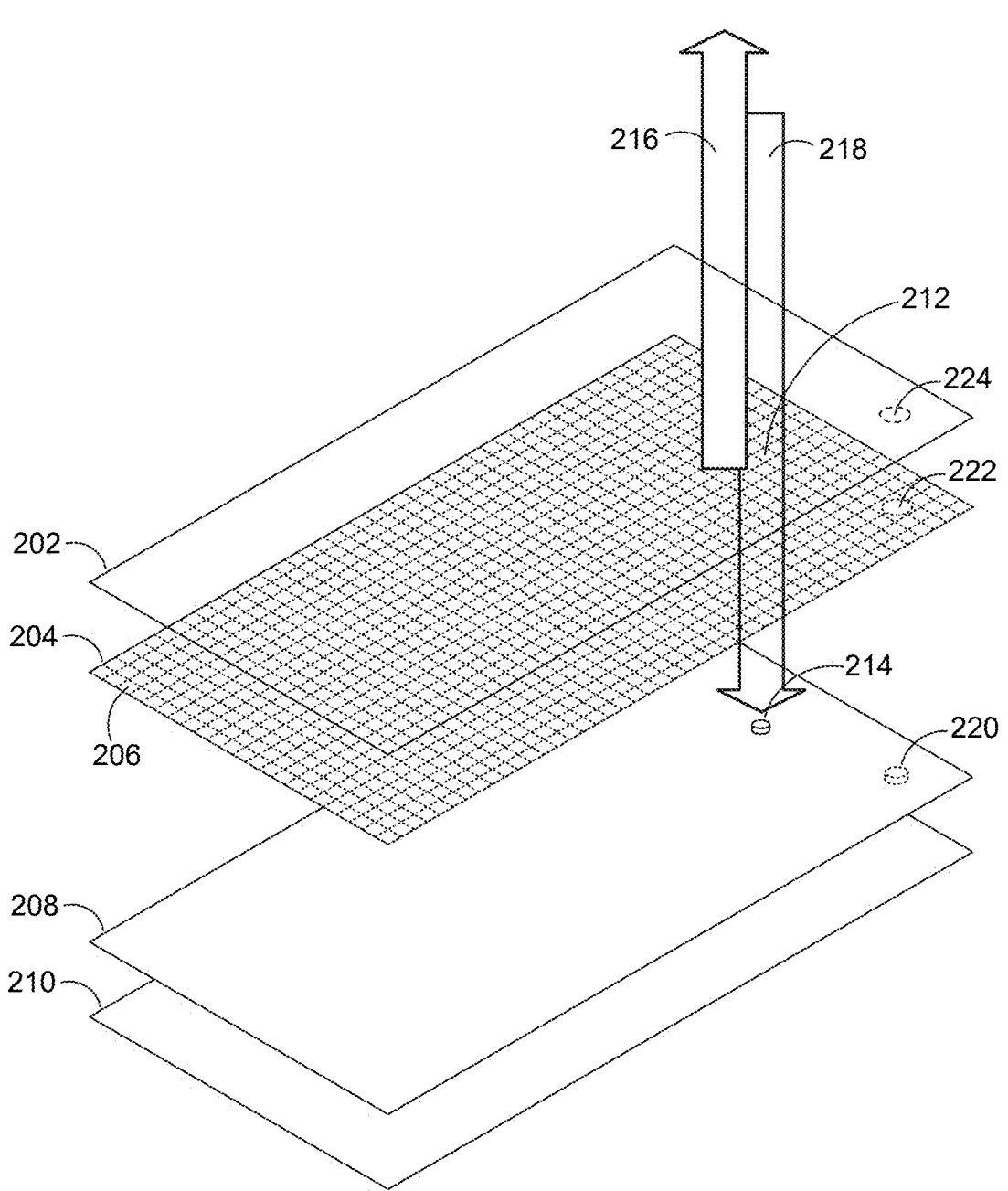
FIG. 2 presents an exploded view of some illustrative components of a user device that positions an ALS sensor beneath a display panel, according to an aspect of the disclosure.

FIG. 2 presents an exploded view of some illustrative components of a user device 200 that positions an ALS sensor beneath a display panel, according to an aspect of the disclosure. The user device 200 may be an example of the user device 100 described in FIG. 1. As shown, user device 200 comprises, among other components, a protective glass layer 202, an organic light-emitting diode (OLED) panel 204 that comprises a plurality of individual OLED sub-pixels 206, a printed circuit board (PCB) 208, and a chassis 210. According to various aspects of the disclosure, the OLED panel 204 is optically transparent and controlled using various drive signals. As an example, the OLED panel 204 may be an active-matrix organic light-emitting diode (AMOLED) panel comprising a plurality of AMOLED sub-pixels. Optionally, the user device 200 may also comprise a frontside camera 220, which may capture images through an opening 222 in the OLED panel 204 and a region 224 of the protective glass layer 202.

The various layers shown in the exploded view of FIG. 2, including the protective glass layer 202, the OLED panel 204, the PCB 208, and the chassis 210, appear to be separated from one another along a vertical axis. However, once the components of the user device 200 are assembled together, these layers are positioned very close to one another along the vertical axis. In particular, one or more light emitters 212 which may be particular ones of the plurality of individual OLED sub-pixels 206, may be positioned in close proximity to and directly above an ALS device 214 mounted on the PCB 208.

In an outward direction, the one or more light emitters 212 may emit display light 216 from the user device 200 to the external environment. In an inward direction, ambient light 218 from the external environment may pass through the transparent OLED panel 204 to reach the ALS device 214. Each of the one or more light emitters 212 may emit light according to an emission profile. In the case of transparent displays such as an OLED panel 204, the emission profile may extend beyond an outward direction such as that illustrated by the display light 216. Indeed, the emission profile may include direction(s) that point inward back into the user device 200 and reach the ALS device 214. Thus, the ALS device 214 can potentially collect photons of light emitted from the display panel 204, in addition to photons of light coming from the environment, thus introducing a positive bias in the ALS measurement.

To effectively reduce such positive bias in the ALS measurement, aspects of the present disclosure provide an improved technique for sensing ambient light intensity. The technique may involve positioning a light sensor in proximity to one or more light emitters, the one or more light emitters forming at least a portion of a display device. The technique may further involve providing one or more timing signals to (1) enable the light sensor to sense ambient light during a first portion of a repeated timing pattern and (2) enable the one or more light emitters to emit display light during a second portion of the repeated timing pattern, wherein the repeated timing pattern is defined by the one or more timing signals, wherein the first portion does not substantially overlap with the second portion of the repeated timing pattern, and wherein the first portion of the repeated timing pattern corresponds to a duty cycle for sensing ambient light within the repeated timing pattern, and the second portion of the repeated timing pattern corresponds to a duty cycle for emitting display light within the repeated timing pattern. According to various embodiments of the disclosure, the one or more light emitters emit light in response to the enabling of the first portion of the timing signal. According to various embodiments, the light sensor senses light in response to the enabling of the second portion of the timing signal. The technique may also involve generating an ambient light intensity measurement based on one or more readings of the light sensor. Furthermore, the technique may involve adjusting the duty cycle for sensing ambient light and the duty cycle for emitting display light within the repeated timing pattern within the repeated timing pattern, in response to the ambient light intensity measurement. The term "does not substantially overlap" in the present context should be understood to mean not having a great degree of overlap between two time periods. Having no overlap between the two time periods, or having a slight overlap of no more than 50%, no more than 40%, no more than 30%, no more than 20%, or no more than 10% of the duration of the shorter of the two time periods, should be considered as not having a substantial overlap, as the term is understood herein. According to an aspect of the disclosure, the first portion does not substantially overlap with the second portion of the repeated timing pattern means: the first portion and the second portion ensure that no display light is emitted from the one or more light emitters when the light sensor is operating to sense ambient light. Aspects of such a technique according to various aspects of the disclosure are discussed in more detail below.

Figure 3:
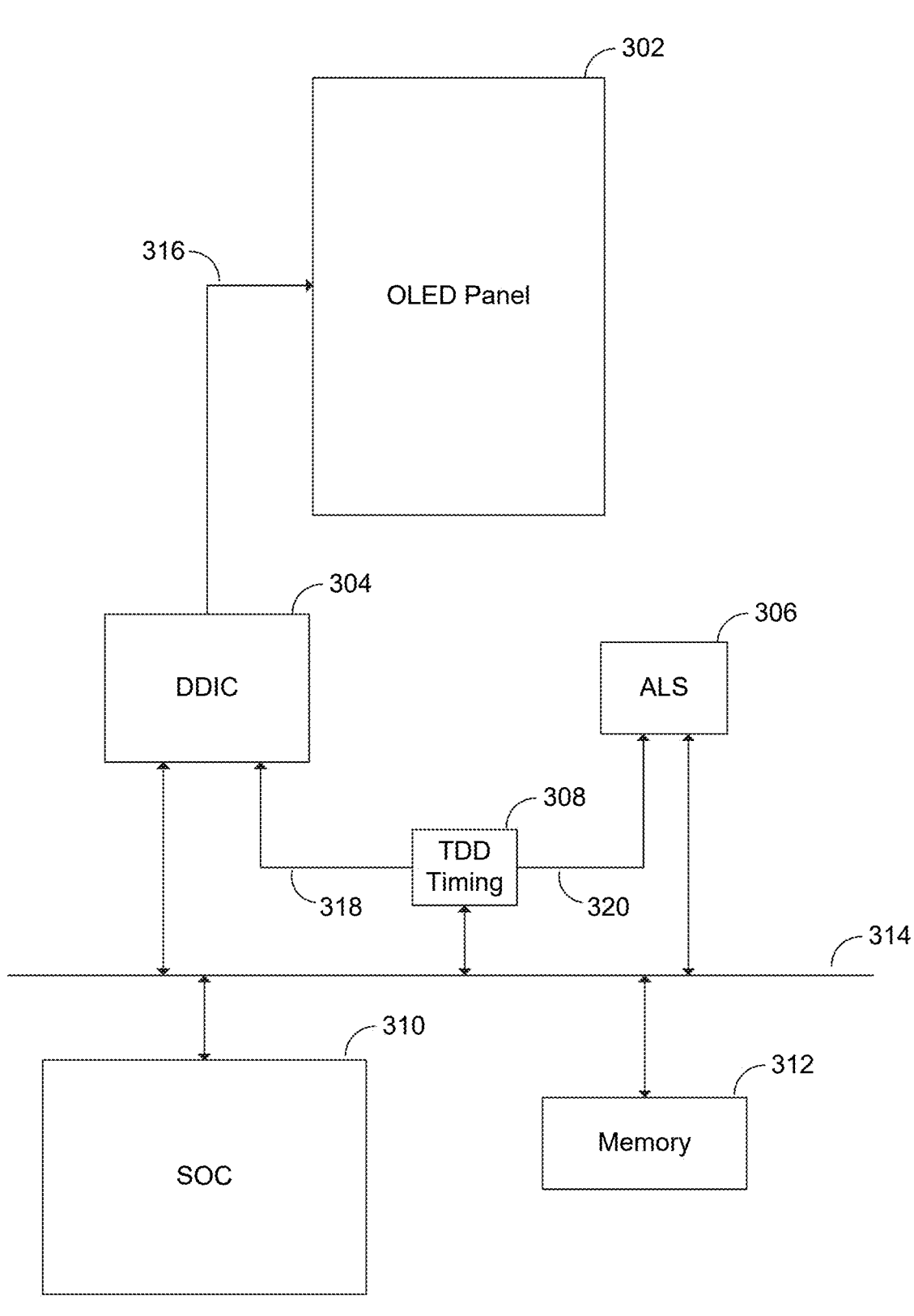
FIG. 3 is a block diagram showing one or more time division duplexing (TDD) timing signals provided by a semiconductor device separate from a timing controller for a light sensor, a timing controller for a display device, and a processor coupled to the light sensor and the display device, according to an aspect of the disclosure.

FIG. 3 is a block diagram showing one or more time division duplexing (TDD) timing signals provided by a semiconductor device separate from a timing controller for a light sensor, a timing controller for a display device, and a processor coupled to the light sensor and the display device, according to an aspect of the disclosure. As shown, a user device 300 may comprise, among other components, an OLED panel 302, a display driver integrated circuit (DDIC) 304, an ALS device 306, a TDD timing controller integrated circuit (IC) 308, an SOC 310, and memory 312. The OLED panel 302 may be an example of the OLED panel 204 previously described in FIG. 2. The SOC 310 is coupled to the DDIC 304 and the ALS device 306 via a bus 314. The memory 312 is also connected with the bus 314 and may be accessed by the SOC 310, the TDD timing controller IC 308, the DDIC 304, and/or the ALS device 306.

A display device for the user device 300 may comprise the OLED panel 302 and the DDIC 304. Image frame data may be provided to the DDIC 304 from a source such as memory 312 working in conjunction with a processor such as SOC 310 and/or a dedicated graphics processor (not shown). The DDIC 304 may receive display content data for each frame to be displayed and provide appropriate driving signals 316 to the OLED panel 302. Such driving signals may adhere to pulse width modulation (PWM) or other schemes for converting display content data into corresponding driving signals of specific amplitudes and/or durations for each sub-pixel of the OLED panel 302. Each "pixel" of the OLED panel 302 may comprise a plurality of sub-pixels of various colors, such as red, green, and blue (RGB) sub-pixels, red, green, green, blue (RGGB) sub-pixels, red, green, blue, white (RGBW) sub-pixels, just to name a few examples.

As shown in FIG. 3, the TDD timing controller IC 308 is an example of a semiconductor device that is separate from a timing controller for the ALS device 306, separate from a timing controller for the DDIC 304 of the display device, and separate from the SOC 310. The TDD timing controller IC 308 may be implemented in a variety of ways. Just as an example, the TDD timing controller IC 308 may be implemented as a simple microcontroller (MCU). In different aspects of the disclosure, the TDD timing controller IC 308 may be implemented as a part of any one or a combination of an application-specific integrated circuit (ASIC), an application-specific standard product (ASSP), an MCU, and/or a full-custom integrated circuit. The TDD timing controller IC 308 provides a display enable timing signal 318 to the DDIC 304. The display enable timing signal 318 defines display light emission periods, during which the DDIC 304 is permitted to provide driving signals 316 to drive sub-pixels of the OLED panel 302. Any display signal modulation scheme, such as PWM, would be implemented within each display light emission period defined by the display enable timing signal 318. In addition, the TDD timing controller IC 308 also provides an ALS enable timing signal 320 to the ALS device 306. The ALS enable timing signal 320 defines ALS sensing periods, during which the ALS device 306 is permitted to capture ambient light from the external environment and generate ALS measurements.

Here, a time division duplexing (TDD) timing structure is presented as an example of a repeated timing pattern. A first portion of the repeated timing pattern corresponds to the duty cycle for sensing ambient light. A second portion of the repeated timing pattern corresponds to a duty cycle for emitting display light. The TDD structure positions the duty cycle for sensing ambient light such that it does not substantially overlap with the duty cycle for emitting display light. By doing so, the TDD timing structure provides a framework to ensure that light captured by the ALS device is primarily composed of ambient light from the external environment and not polluted by display light from the display device. The timing structure allows display content to be presented to the user, while providing sufficient opportunities for the ALS device to make ambient light intensity measurements.

Figure 4:
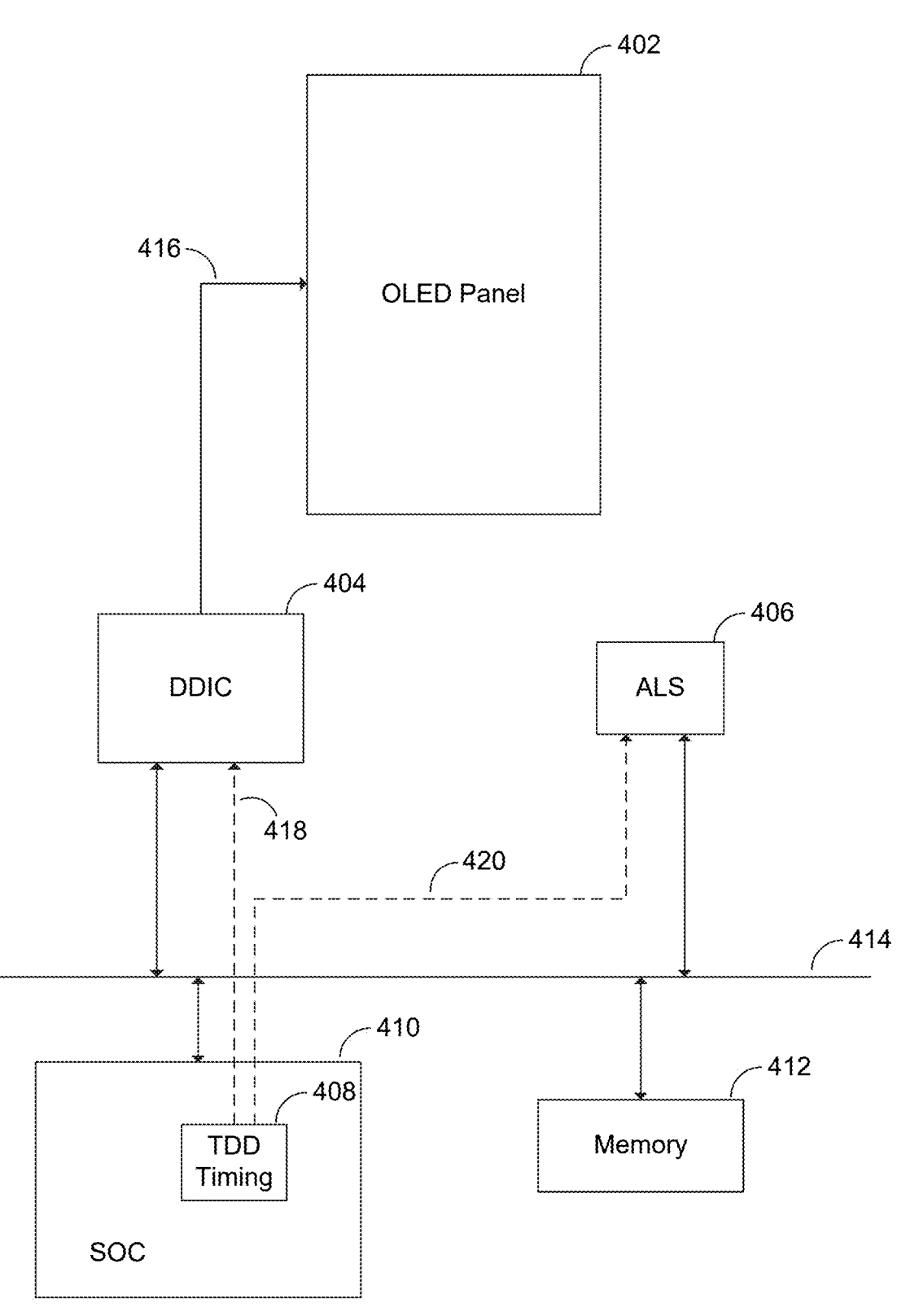
FIG. 4 is a block diagram showing one or more time division duplexing (TDD) timing signals provided by a processor coupled to a light sensor and a display device, according to an aspect of the disclosure.

FIG. 4 is a block diagram showing one or more time division duplexing (TDD) timing signals provided by a processor coupled to a light sensor and a display device, according to an aspect of the disclosure. As shown, a user device 400 may comprise, among other components, an OLED panel 402, a display driver integrated circuit (DDIC) 404, an ALS device 406, a TDD timing controller module 408, an SOC 410, and memory 412. The OLED panel 402 may be an example of the OLED panel 204 previously described in FIG. 2. The SOC 410 is coupled to the DDIC 404 and the ALS device 406 via a bus 414. The memory 412 is also connected with the bus 414 and may be accessed by the SOC 410, the TDD timing controller module 408, the DDIC 404, and/or the ALS device 406.

A display device for the user device 400 may comprise the OLED panel 402 and the DDIC 404. Image frame data may be provided to the DDIC 404 from a source such as memory 412 working in conjunction with a processor such as SOC 410 and/or a dedicated graphics processor (not shown). The DDIC 404 may receive display content data for each frame to be displayed and provide appropriate driving signals 416 to the OLED panel 402. Such driving signals may be formed based on pulse width modulation (PWM) or other light modulation schemes, as discussed previously.

As shown in FIG. 4, the TDD timing controller module 408 is an example of a timing controller implemented within a processor, which in this case is the SOC 410. As such, the TDD timing controller module 408 may be realized in the form of a software module, i.e., portion of executable instructions that can be carried out by SOC 410 to generate input/output (I/O) signals to control display and ALS timing. Here, the TDD timing controller module 408 provides a display enable timing signal 418 to the DDIC 404. The display enable timing signal defines display light emission periods, during which the DDIC 404 is permitted to provide driving signals 416 to drive sub-pixels of the OLED panel 402. In addition, the TDD timing controller module 408 also provides an ALS enable timing signal 420 to the ALS device 406. The ALS enable timing signal defines ALS sensing periods, during which the ALS device 306 is permitted to capture ambient light from the external environment and generate ALS measurements.

Once again, time division duplexing (TDD) timing is presented as an example of a repeated timing pattern. A first portion of the repeated timing pattern corresponds to the duty cycle for sensing ambient light. A second portion of the repeated timing pattern corresponds to a duty cycle for emitting display light. The TDD structure ensures that the duty cycle for sensing ambient light does not substantially overlap with the duty cycle for emitting display light.

Figure 5:
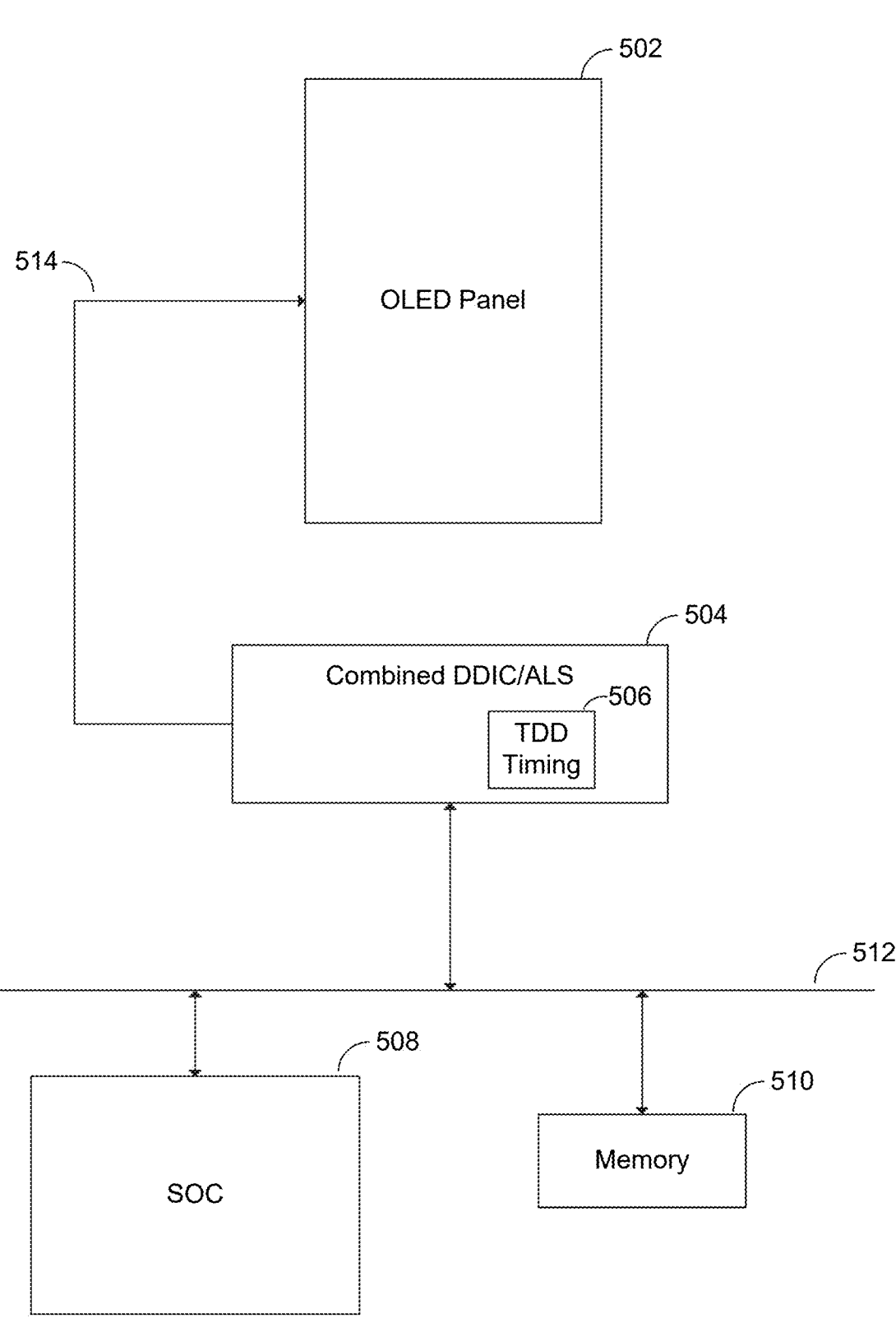
FIG. 5 is a block diagram showing one or more time division duplexing (TDD) timing signals provided by a combined timing controller for a light sensor and a display device, according to an aspect of the disclosure.

FIG. 5 is a block diagram showing one or more time division duplexing (TDD) timing signals provided by a combined timing controller for a light sensor and a display device, according to an aspect of the disclosure. As shown, a user device 500 may comprise, among other components, an OLED panel 502, a combined display driver integrated circuit (DDIC) and ALS controller 504 (which comprises a TDD timing controller 506), an SOC 508, and memory 510. The OLED panel 502 may be an example of the OLED panel 204 previously described in FIG. 2. The SOC 508 is coupled to the combined DDIC and ALS controller 504 via a bus 512. The memory 510 is also connected with the bus 512 and may be accessed by the SOC 508 and/or the combined DDIC and ALS controller 504.

A display device for the user device 500 may comprise the OLED panel 502 and a portion of the combined DDIC and ALS controller 504. Image frame data may be provided to the combined DDIC and ALS controller 504 from a source such as memory 510 working in conjunction with a processor such as SOC 508 and/or a dedicated graphics processor (not shown). The combined DDIC and ALS controller 504 may receive display content data for each frame to be displayed and provide appropriate driving signals 514 to the OLED panel 502. Such driving signals may be formed based on pulse width modulation (PWM) or other techniques, as discussed previously.

As shown in FIG. 5, the combined DDIC and ALS controller 504 comprises the TDD timing controller 506, which is an example of a combined timing controller for the light sensor and the display device. The TDD timing controller 506 provides a display enable timing signal to the DDIC portion of the combined DDIC and ALS controller 504. The display enable timing signal defines display light emission periods, during which the DDIC portion of the combined DDIC and ALS controller 504 is permitted to provide driving signals 514 to drive sub-pixels of the OLED panel 502. In addition, the TDD timing controller 506 also provides an ALS enable timing signal to the ALS portion of the combined DDIC and ALS controller 504. The ALS enable timing signal defines ALS sensing periods, during which the ALS portion of the combined DDIC and ALS controller 504 is permitted to capture ambient light from the external environment and generate ALS measurements. Just as an example, the combined DDIC and ALS controller 504 may be implemented as an application-specific integrated circuit (ASIC). In different aspects of the disclosure, the combined DDIC and ALS controller 504 may be implemented as a part of any one or a combination of an ASIC, an application-specific standard product (ASSP), and/or a full-custom integrated circuit.

Once again, time division duplexing (TDD) timing is presented as an example of a repeated timing pattern. A first portion of the repeated timing pattern corresponds to the duty cycle for sensing ambient light. A second portion of the repeated timing pattern corresponds to a duty cycle for emitting display light. The TDD structure ensures that the duty cycle for sensing ambient light does not substantially overlap with the duty cycle for emitting display light.

Figure 6:
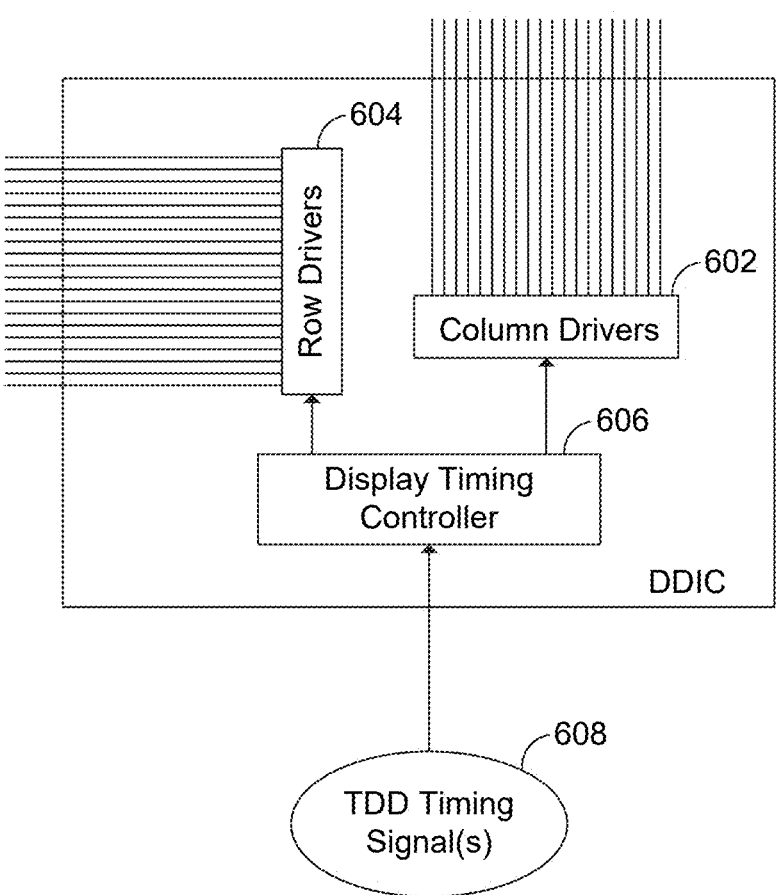
FIG. 6 is a block diagram illustrating further details of a display driver integrated circuit (DDIC) according to some aspects of the present disclosure.

FIG. 6 is a block diagram illustrating further details of a display driver integrated circuit (DDIC) according to some aspects of the present disclosure. As shown, a DDIC 600 may comprise, among other components, one or more sets of column drivers 602, one or more sets of row drivers 604, and a display timing controller 606. The DDIC 600 may be an example of the DDIC 304 shown in FIG. 3 or the DDIC 404 shown in FIG. 4, which are described previously. The display timing controller 606 provides appropriate timing and/or control signals to the column drivers 602 and row drivers 604, which in turn generates column driving signals and row driving signals, respectively, as outputs signals provided from the DDIC 600 to the display panel (not shown). The column driving signals and row driving signals are coordinated to individually address and turn on each sub-pixel in the display panel at particular amplitudes and/or particularly durations (e.g., in a PWM scheme) according to a brightness level for each sub-pixel, to present a frame of color image data on the display panel. Image frames are updated according to a frame rate, e.g., at 60 frames per second (FPS), 90 FPS, or some other frame rate. The display timing controller 606 thus serves an important role in the proper generation of driving signals for the display panel.

According to some aspects of the disclosure, the DDIC 600 receives one or more TDD timing signals 608 from an external source and provides them to the display timing controller 606. An example of the one or more TDD timing signals 608 is a display enable timing signal, such as the display enable timing signal 318 shown in FIG. 3 or the display enable timing signal 418 shown in FIG. 4, described previously. Such a display enable timing signal may define periods of time during which the DDIC 600 is permitted to provide column driving and row driving signals to turn on sub-pixels in the display panel.

The DDIC 600 may include other components not explicitly shown in FIG. 6. For example, the DDIC 600 may include power generation circuitry for providing sufficient voltage/current to the column driving signals and row driving signals. The DDIC 600 may also include memory such as random access memory (RAM) for temporarily storing sub-pixel values and other data. The DDIC 600 may also include an interface module that supports a data interface for transferring data to and from the DDIC 600.

Figure 7:
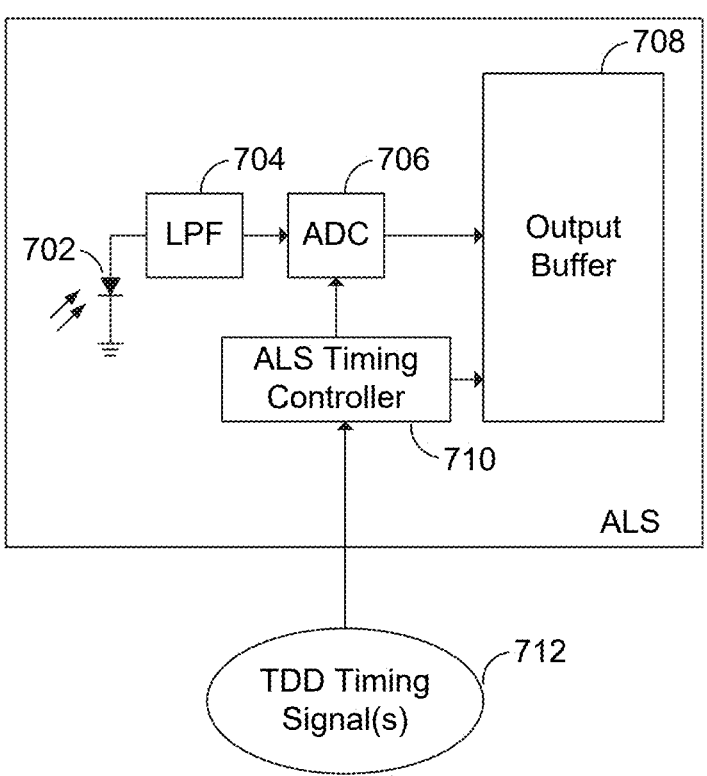
FIG. 7 is a block diagram illustrating further details of an ambient light sensor (ALS) device according to some aspects of the present disclosure.

FIG. 7 is a block diagram illustrating further details of an ambient light sensor (ALS) device according to some aspects of the present disclosure. As shown, an ALS device 700 comprises, among other components, at least one photodiode 702, a lowpass filter (LPF) 704, an analog-to-digital converter (ADC) 706, an output buffer 708, and an ALS timing controller 710. The ALS device 700 may be an example of the ALS device 306 shown in FIG. 3 or the ALS device 406 shown in FIG. 4, which are described previously. The ALS device 700 measures the intensity of ambient light. Acting as a light sensor, the at least one photodiode 702 converts photons of ambient light from the external environment to an electrical charge. The more intense the ambient light, greater the electrical charge produced in a given time duration. The LPF 704 may remove noise and other high frequency components from the signal generated by the at least one photodiode 702. According to some aspects of the disclosure, the resulting electrical charge may be accumulated as analog signals. For example, the electrical charge may be accumulated in charge storage components such as capacitive circuits, i.e., circuits comprising one or more capacitors (not shown). Such charge storage components may form a part of the LPF 704. The accumulated electrical charge, which may be reflected as a voltage, can then be converted by the ADC 706 to a digital light intensity value representing the ALS reading. According to some aspects of the disclosure, the resulting electrical charge may be converted by the ADC 706 to digital light intensity values, which may be digitally accumulated to generate an ALS measurement. In some aspects of the disclosure, a combination of analog accumulation and digital accumulation of electrical charges and/or light intensity values may be performed, to generate the ALS measurement. Each ALS reading may result from multiple exposures of the at least one photodiode 702 over one or more specified periods of time. Furthermore, multiple ALS readings may be accumulated, digitally and/or in analog form, to generate an ALS measurement.

According to some aspects of the disclosure, the ALS device 700 receives one or more TDD timing signals 712 from an external source and provides them to the ALS timing controller 710. An example of the one or more TDD timing signals is an ALS enable signal, such as the ALS enable timing signal 320 shown in FIG. 3 or the ALS enable timing signal 420 shown in FIG. 4, described previously. Such an ALS enable timing signal may define periods of time during which the ALS device 700 is permitted to sense photons of light for generating an ALS measurement. Thus, when the ALS enable timing signal indicates that ALS measurement is not permitted (e.g., ALS enable timing signal exhibits a LOW or OFF value), analog and/or digital accumulation of electrical charges and/or light intensity values may cease, and any storage of such charges or values may be retrieved and/or cleared. For example, any capacitive circuits for storing charges generated by the at least one photodiode 702 may be disconnected from the signal source, and any digital accumulation components may be paused, during such times. When the ALS enable timing signal indicates that ALS measurement is permitted (e.g., ALS enable timing signal exhibits a HIGH or ON value), analog and/or digital accumulation of electrical charges and/or light intensity values may commence and continue until an ALS measurement is generated.

Figure 8:
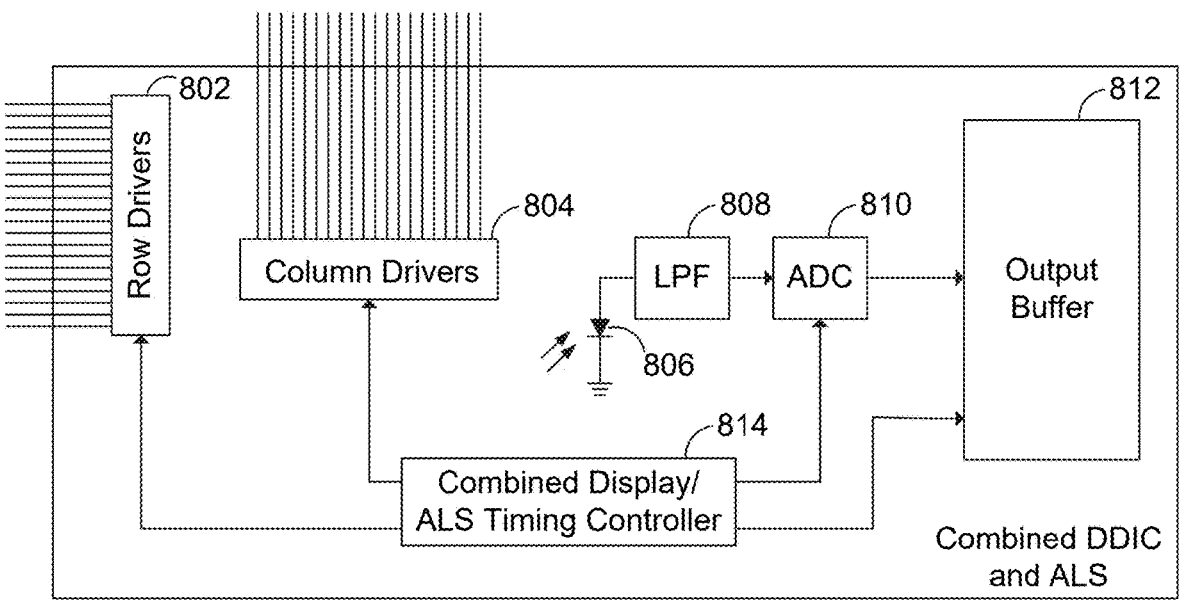
FIG. 8 is a block diagram illustrating further details of a combined DDIC and ALS controller, according to some aspects of the disclosure.

FIG. 8 is a block diagram illustrating further details of a combined DDIC and ALS controller, according to some aspects of the disclosure. As shown, a combined DDIC and ALS controller 800 comprises one or more sets of row drivers 802, one or more sets of column drivers 804, a lowpass filter (LPF) 808, an analog-to-digital converter (ADC) 810, an output buffer 812, and a combined display and ALS timing controller 814. The combined DDIC and ALS controller 800 may be an example of the combined DDIC and ALS controller 504 shown in FIG. 5, described previously. The row drivers 802 and column drivers 804 generate row and column driving signals as outputs signals provided from the combined DDIC and ALS controller 800 to the display panel (not shown). The row and column driving signals are coordinated to individually address and turn on each sub-pixel in the display panel at particular amplitudes and/or particularly durations (e.g., according to a PWM scheme) according to a brightness level for each sub-pixel, to present a frame of color image data on the display panel.

Acting as a light sensor, the photodiode 806 converts photons of ambient light from the external environment to an electrical charge. The more intense the ambient light, greater the electrical charge produced in a given time duration. The LPF 808 may remove noise and other high frequency components from the signal generated by photodiode 806. According to some aspects of the disclosure, the resulting electrical charge may be accumulated as analog signals. For example, the electrical charge may be accumulated in charge storage components such as capacitive circuits, i.e., circuits comprising one or more capacitors (not shown). Such charge storage components may form a part of the LPF 808. The accumulated electrical charge, which may be reflected as a voltage, can then be converted by the ADC 810 to a digital light intensity value representing the ALS reading. According to some aspects of the disclosure, the resulting electrical charge may be converted by the ADC 810 to digital light intensity values, which may be digitally accumulated to generate an ALS measurement. In some aspects of the disclosure, a combination of analog accumulation and digital accumulation of electrical charges and/or light intensity values may be performed, to generate the ALS measurement. Each ALS reading may result from multiple exposures of the photodiode 806 over one or more specified periods of time. Furthermore, multiple ALS readings may be accumulated, digitally and/or in analog form, to generate an ALS measurement.

The combined display and ALS timing controller 814 provides one or more timing signals to coordinate the timing of display and ALS operations based on a time-division duplexing (TDD) scheme, according to certain aspects of the disclosure. As shown, the combined display and ALS timing controller 814 provides appropriate timing and/or control signals to the row drivers 802 and column drivers 804. Such a display enable timing signal may define periods of time during which the DDIC portion of the combined DDIC and ALS controller 800 is permitted to provide column driving and row driving signals to turn on sub-pixels in the display panel. In addition, the combined display and ALS timing controller 814 also provides one or more ALS enable timing signals to the ADC 810 and the output buffer 812, to define periods of time during which the ALS portion of the combined DDIC and ALS controller 800 is permitted to sense photons of light for generating an ALS measurement. Thus, when the ALS enable timing signal indicates that ALS measurement is not permitted (e.g., ALS enable timing signal exhibits a LOW or OFF value), analog and/or digital accumulation of electrical charges and/or light intensity values may cease, and any storage of such charges or values may be retrieved and/or cleared. For example, any capacitive circuits for storing charges generated by the photodiode 806 may be disconnected from the signal source, and any digital accumulation components may be paused, during such times. When the ALS enable timing signal indicates that ALS measurement is permitted (e.g., ALS enable timing signal exhibits a HIGH or ON value), analog and/or digital accumulation of electrical charges and/or light intensity values may commence and continue until an ALS measurement is generated. Use of a combined DDIC and ALS controller 800 can be associated with benefits such as reduction of the overall physical size and/or thickness of the user device in which the display and ALS function are implemented. Such a unified display and ALS hardware chipset can provide improved, flexible function control of the display and ALS operations.

Figure 9:
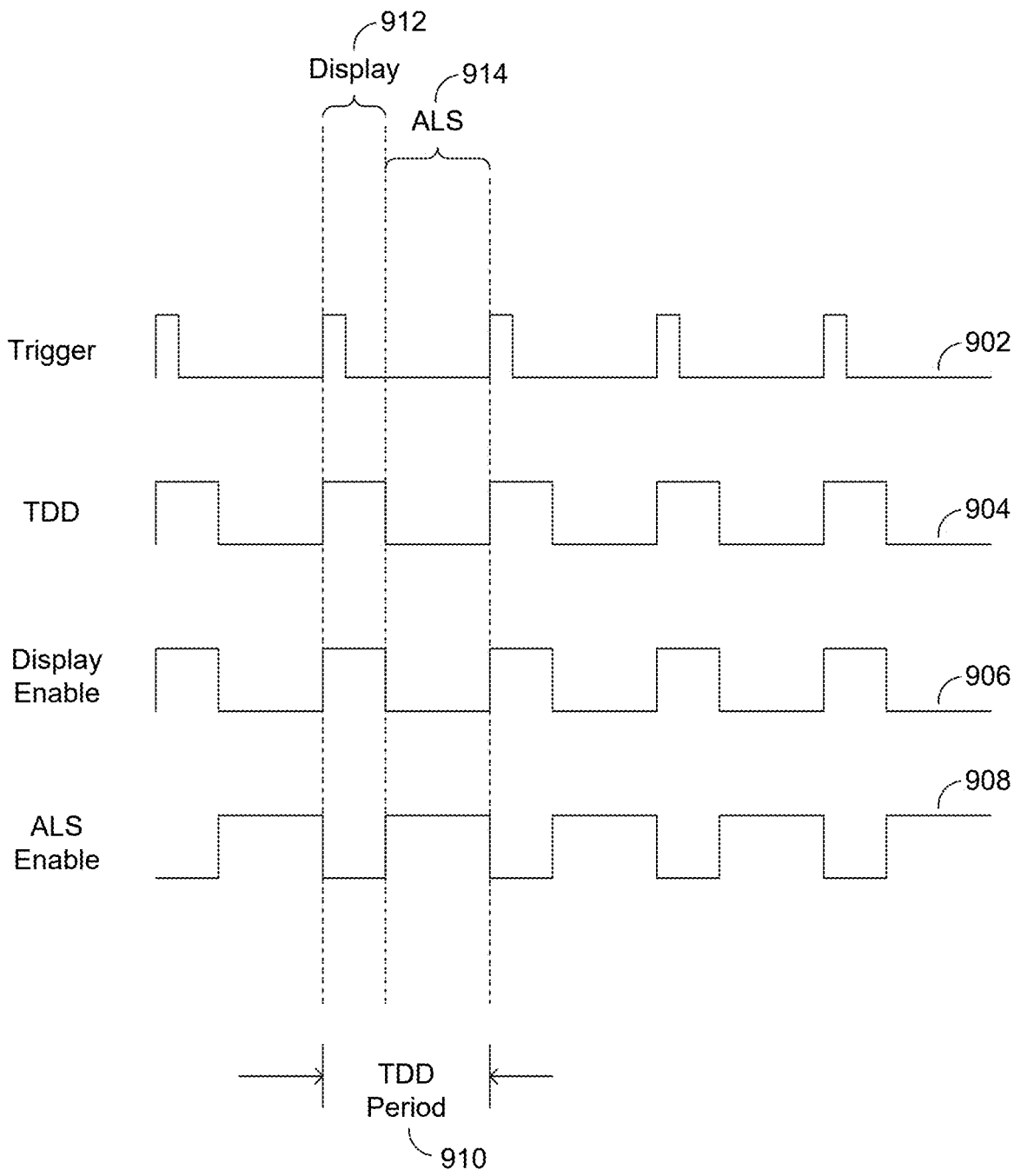
FIG. 9 is a timing diagram showing various signals based on a time division multiplexing (TDD) structure to support periodic, substantially non-overlapping time durations for sensing ambient light and emitting display light, according to some aspects of the disclosure.

FIG. 9 is a timing diagram showing various signals based on a time division multiplexing (TDD) structure to support periodic, substantially non-overlapping time durations for sensing ambient light and emitting display light, according to some aspects of the disclosure. Shown in the figure are a trigger signal 902, a TDD signal 904, a display enable timing signal 906, and an ALS enable timing signal 908. The TDD signal 904 is a periodic signal, comprised of a plurality of TDD periods 910, that reflects how time is divided between display and ALS functions. The trigger signal 902 may be based on a clock signal (not shown) and is configured to provide a periodic trigger to start each TDD period 910. Each TDD period 910 of the TDD signal 904 comprises a display-enable portion 912 and an ALS-enable portion 914. In the example shown in FIG. 9, a HIGH value of the TDD signal 904 represents the display-enable portion 912 of the TDD period, and a LOW value of the TDD signal 904 represents the ALS-enable portion 914 of the TDD period. In other examples, the assignment of HIGH and LOW values of the TDD signal 904 can be swapped or otherwise altered. In the example shown in FIG. 9, the display-enable portion 912 of the TDD period does not substantially overlap—indeed does not overlap at all—with the ALS-enable portion 914 of the TDD period. In other example discussed later, the display-enable portion 912 of the TDD period may slightly overlap with the ALS-enable portion 914 of the TDD period.

According to one aspect of the disclosure, the TDD signal 904 may be used as a common signal that is provided to both the display timing controller and the ALS timing controller. For example, referring back to FIG. 6, the TDD signal 904 may be used as the TDD timing signal 608 provided to the display timing controller 606. The display timing controller 606 would recognize that a HIGH value of the TDD signal 904 corresponds to the display-enable portion 912 of each TDD period and would enable the display operation according. Referring back to FIG. 7, the same TDD signal 904 may also be used as the TDD timing signal 712 provided to the ALS timing controller 710. The ALS timing controller 710 would recognize that a LOW value of the TDD signal 904 corresponds to the ALS-enable portion 914 of each TDD period and would enable the ALS operation accordingly. Use of such a common timing signal for both display and ALS enablement can reduce the number of signals and simplify implementation in terms of routing, for instance.

By contrast, according to another aspect of the disclosure, multiple timing signals may be used for enabling display and ALS operations. For instance, the multiple timing signals may comprise (1) a first timing signal (e.g., the ALS enable timing signal 908) to enable the light sensor to sense ambient light during the first portion of the repeated timing pattern and (2) a second timing signal (e.g., the display enable timing signal 906), different from the first timing signal, to enable the one or more light emitters to emit display light during the second portion of the repeated timing pattern. Here, the ALS enable timing signal 908 may also be used as the TDD timing signal 712 provided to the ALS timing controller 710. The ALS timing controller 710 would recognize that a HIGH value of the ALS enable timing signal 908 corresponds to the ALS-enable portion 914 of each TDD period and would enable the ALS operation accordingly. Separately, display enable timing signal 906 may be used as the TDD timing signal 608 provided to the display timing controller 606. The display timing controller 606 would recognize that a HIGH value of the display enable timing signal 906 corresponds to the display-enable portion 912 of each TDD period and would enable the display operation according. Use of separate timing signals for display and ALS enablement can simplify interpretation of the timing signals from the perspective of the ALS timing controller and the display timing controller.

Interspersing ALS and display operations through the use of a periodic timing structure, such as the repeated TDD period 910 shown in FIG. 9, provides a flexible framework that integrates well with display functionality. For example, a display modulation scheme such as pulse width modulation (PWM), used for modulating the duration of light to achieve appropriate brightness levels, may be confined to the display-enable portion 912 of each TDD period 910. For example, a display driver such as a DDIC device may control display driving signals in accordance with the PWM scheme. According to aspects of the present disclosure, only during the display-enable portion 912 of the TDD period 910 is the display driver (e.g., DDIC 304, DDIC 404, combined DDIC/ALS controller 504, DDIC 600, and combined DDIC/ALS controller 800) permitted to turn on sub-pixels in the display panel. For example, the PWM period may be implemented over the display-enable portion 912 of the TDD period. Under such an arrangement, full brightness of a sub-pixel would correspond to illumination of the sub-pixel for the entire duration (e.g., 100%) of the display-enable portion 912 of the TDD period 910. If the defined brightness level for the sub-pixel is less than full brightness, the sub-pixel may be illuminated for corresponding percentage (e.g., 40%) of the display-enable portion 912 of the TDD period 910, as defined by the PWM scheme. According to some aspects of the disclosure, the TDD/PWM rate is higher than the frame rate of the image data being presented by the display unit. In one example, the PWM rate is 1000 Hz, and the frame rate of the display unit is 120 Hz. Here, each frame of pixels can be turned on/off 8 times according to the TDD/PWM scheme. In other words, during each frame of display data, 8 TDD periods may occur, and each TDD period may encompass one PWM cycle.

Figure 10:
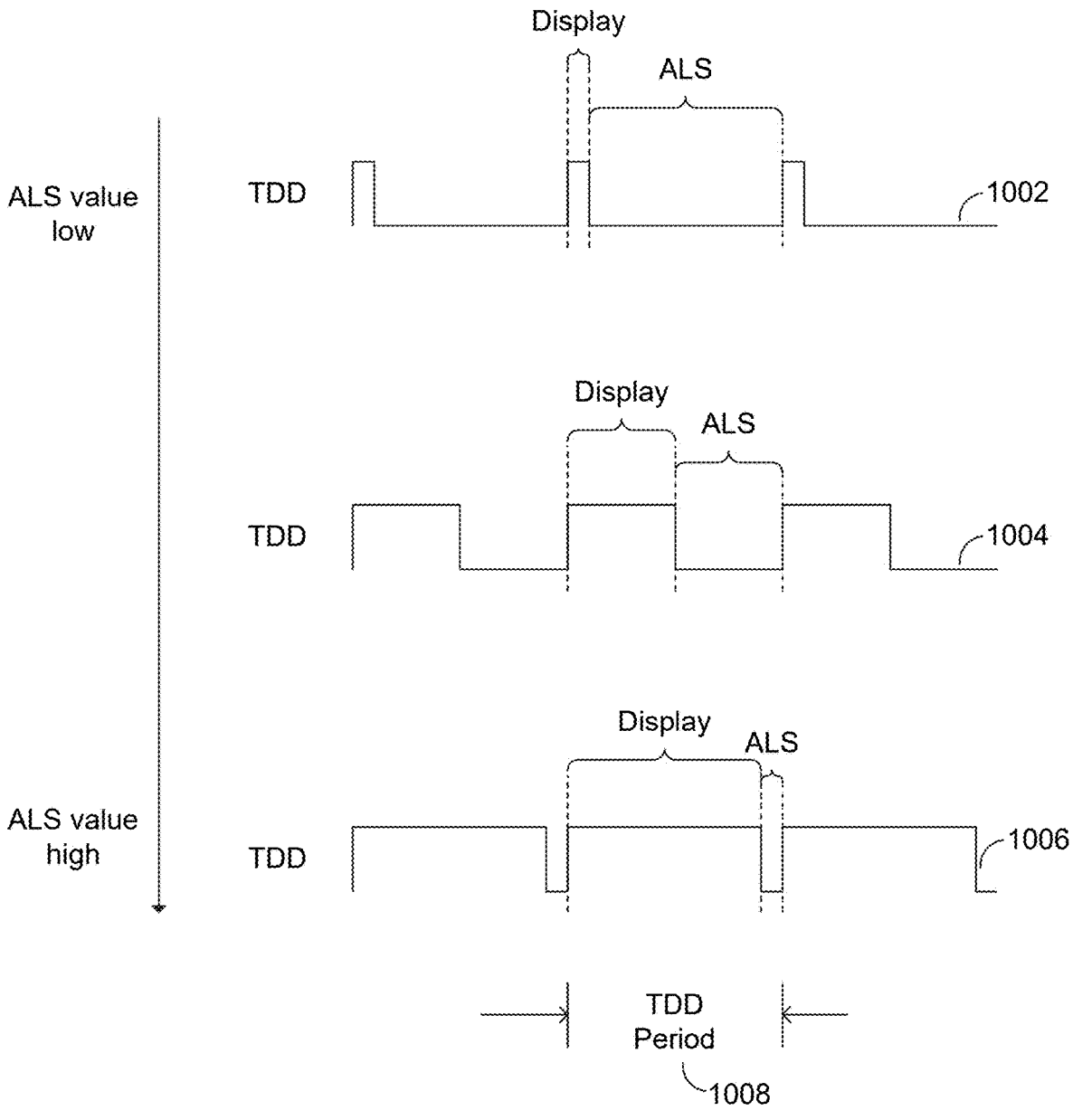
FIG. 10 illustrates display and ALS duty cycles that are dynamically adjusted based on the current ALS value, according to some aspects of the disclosure.

FIG. 10 illustrates display and ALS duty cycles that are dynamically adjusted based on the current ALS value, according to some aspects of the disclosure. In accordance with one aspect, the duty cycle for sensing ambient light within a repeated timing pattern (e.g., repeated TDD period 1008) is increased, in response to a decrease in the ambient light intensity measurement. In accordance with one aspect, the duty cycle for sensing ambient light within the repeated timing pattern (e.g., repeated TDD period 1008) is decreased, in response to an increase in the ambient light intensity measurement. FIG. 10 shows the operation of such dynamic adjustment by presenting a TDD signal as it exists at three levels of detected ambient light intensity, corresponding to a TDD signal 1002, a TDD signal 1004, and a TDD signal 1006.

The TDD signal 1002, which exists at time when the ambient light intensity is relatively low, has a display duty cycle that is relatively short and an ALS duty cycle that is relatively long. Such low ambient light intensity may correspond, for example, to the user device (e.g., user device 100) being in an indoor environment or other low-light environment. As shown, the display-enable portion of the TDD period 1008 is relatively short, reflecting a short display duty cycle. In such low-ambient light conditions, the required intensity of display light is not very high, and thus the relatively short display duty cycle may be sufficient for presenting image content on the screen of the user device. By contrast, the ALS-enable portion of TDD period 1008 is relatively long, reflecting a long ALS duty cycle. In such low-light conditions, fewer photons are available from the ambient environment. In accordance with an aspect of the disclosure, controlling the duration of the ALS-enable portion of the TDD period 1008 as a function of the detected intensity of ambient light results in extending the period of exposure for the ALS sensor in low-light conditions to capture a sufficient number of photons to generate an accurate and reliable ALS measurement.

As the ambient light intensity increases, the display duty cycle and ALS duty cycle may dynamically adjust. For example, the TDD signal 1004, which exists at a time when the ambient light intensity is roughly midway between low and high extremes, has a display duty cycle that is longer and an ALS duty cycle that is shorter, compared to that of the TDD signal 1002. In the particular example shown, the display duty cycle and the ALS duty cycle are about equal.

As the ambient light intensity further increases, the display duty cycle and ALS duty cycle may further adjust dynamically. For example, the TDD signal 1006, which exists at a time when the ambient light intensity is relatively high, has a display duty cycle that is relatively long and an ALS duty cycle that is relatively short. Such high ambient light intensity may correspond, for example, to the user device being in an outdoor environment or other high-brightness environment. As shown, the display-enable portion of the TDD period 1008 is relatively long, reflecting a long display duty cycle. In such high-brightness conditions, the required intensity of display light may also be high, which necessitates a longer display duty cycle in order to generate sufficient light for the user to discern the image content being presented on the screen of the user device in the presence of bright ambient light. By contrast, the ALS-enable portion of the TDD period 1008 is relatively short, reflecting a short ALS duty cycle. In accordance with an aspect of the disclosure, controlling the duration of the ALS-enable portion of the TDD period 1008 as a function of the detected intensity of ambient light results in shortening the period of exposure for the ALS sensor in high-brightness conditions to capture a sufficient number of photons to generate an accurate and reliable ALS measurement, while leaving a longer display-enable portion of the TDD period 1008 for generating sufficient display light in the presence of bright ambient light.

While the prior discussion of FIG. 10 describes a transition from low-light conditions to high-brightness conditions, the dynamic adjustment of display and ALS duty cycles can also occur when the ambient light intensity transitions in the opposite direction—i.e., from high-brightness to low-light conditions. Specifically, as the ALS intensity value decreases, the display duty cycle may be decreased and the ALS duty cycle may be increased. The ALS intensity may be continually monitored, and the display and ALS duty cycles may be continually adjusted in a dynamic fashion.

Generally speaking, the brighter the ambient light environment, the longer the display duty cycle and shorter the ALS duty cycle. The dimmer the ambient light environment, the shorter the display duty cycle and longer the ALS duty cycle. Just as a simple example, in an outdoor environment, the display duty cycle may be, e.g., 95%, and the ALS duty cycle may be, e.g., 5%. In an indoor environment, the display duty cycle can be, e.g., 5%, and the ALS duty cycle may be, e.g., 95%. The particular duty cycle values chosen in this example are presented for illustration only. Also, the particular proportions of display duty cycle and ALS duty cycle shown in FIG. 10, including those shown for TDD signals 1002, 1004, and 1006, are presented for illustrative purposes only. The time durations and relative duty cycles shown in the figure are not meant to limit possible implementations of the disclosure. For example, FIG. 10 illustrates an implementation in which the TDD signal 1004 exhibits a display duty cycle and an ALS duty cycle that appear equal in duration at a time when the ambient light intensity is roughly midway between low and high extremes. In a different implementation, the TDD signal 1004 may exhibit a display duty cycle and an ALS duty cycle that are not equal in duration (e.g., the display duty cycle may be longer, or shorter, than the ALS duty cycle) for an ALS intensity value that is roughly midway between high and low extremes.

Indeed, in one aspect of the disclosure, the change in the display duty cycle ($\Delta$_DutyCycleDisplay) and the ALS duty cycle ($\Delta$_DutyCycleALS) may be flexibly defined as functions of the change in the detected ambient light intensity ($\Delta$_ALS). For example:

$$\Delta\_DutyCycleDisplay = F_1\{\Delta\_ALS\} \quad \text{(Eq. 1)}$$

$$\Delta\_DutyCycleALS = F_2\{\Delta\_ALS\} \quad \text{(Eq. 2)}$$

According to aspects of the disclosure, the function $F_1$ is an increasing function, and the function $F_2$ is a decreasing function. In some aspects, one or both of the functions $F_1$ and $F_2$ are linear functions. In other aspects, one or both of the functions $F_1$ and $F_2$ are non-linear function, such as exponential functions. In certain aspects, the display duty cycle and the ALS duty cycle also satisfy the constraint that they have a combined duration equal to or less than the TDD period:

$$(\Delta\_DutyCycleDisplay + \Delta\_DutyCycleALS) = < TDD \text{ period.} \quad \text{(Eq. 3)}$$

Figure 11:
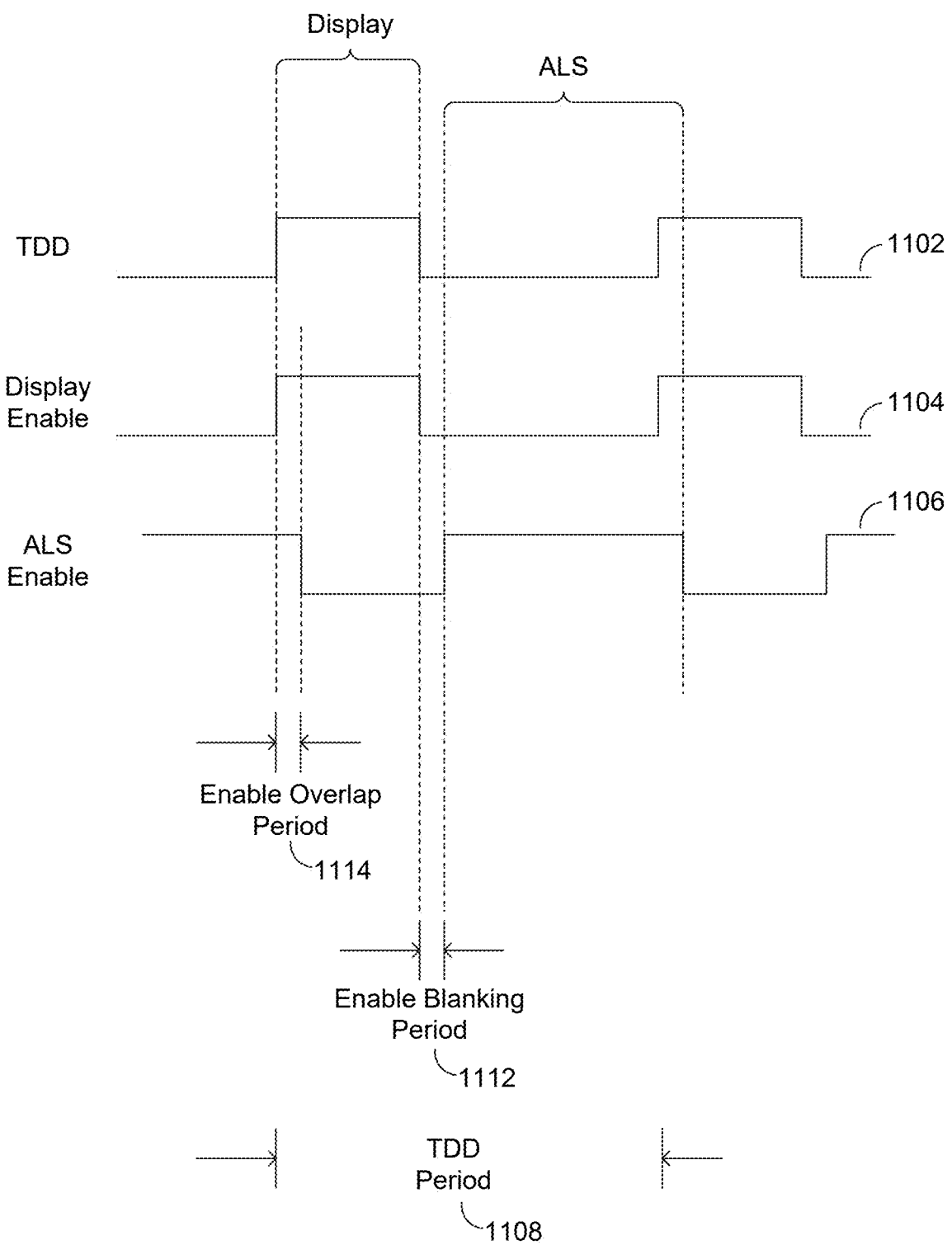
FIG. 11 illustrates the use of blanking periods and overlap periods in the enable signals provided for display operations and ALS operations, according to some aspects of the disclosure.

FIG. 11 illustrates the use of blanking periods and overlap periods in the enable signals provided for display operations and ALS operations, according to some aspects of the disclosure. Such blanking periods may be used to accommodate various types of delays associated with physical components that do not respond instantaneously to enable signals but instead may have non-zero response times. Such arrangements may be adopted to ensure that the first portion of the repeated timing pattern does not substantially overlap with the second portion of the repeated timing pattern. Specifically, the first portion and the second portion ensure that no display light is emitted from the one or more light emitters when the light sensor is operating to sense ambient light. The figure shows a TDD signal 1102, a display enable signal 1104, and an ALS enable signal 1106, which form parts of a repeated timing pattern. The repeated timing pattern exhibits a TDD period 1108, which is repeated in time.

In one aspect of the disclosure, the repeated timing pattern includes one or more enable blanking periods 1112 during which both one or more light emitters (e.g., sub-pixels of the OLED panel 204) and the light sensor (e.g., ALS device 214) are disabled. For example, each of the one or more enable blanking periods may be located between an end of the second portion of the repeated timing pattern and a beginning of the first portion of the repeated timing pattern. Here, each of the one or more enable blanking periods 1112 may be based on a display-off response time associated with the one or more light emitters. In addition, the one or more enable blanking periods 1112 may further be based on parameters other than the display-off response time. According to an aspect of the disclosure, the display-off response time is a delay from the end of the second portion of the repeated timing pattern to a time at which the one or more light emitters are actually turned off. There may be a response time, or delay, between the moment the display enable signal 1104 transitions from HIGH to LOW and when the light emitters of the display panel actually turn off (referred to here as the "display-OFF response time"). To avoid turning on the ALS sensor immediately, while the emitters are still on, the enable blanking period 1112 may be introduced, to allow time for the light emitters of the display to turn off, before allowing the ALS enable signal 1106 to transition from LOW to HIGH. In this aspect of the disclosure, the display-OFF response time tends to increase the duration of the enable blanking period 1112.

Each of the one or more enable blanking periods 1112 may further be based on a sensor-on response time associated with the light sensor. In addition, the one or more enable blanking periods 1112 may further be based on parameters other than the sensor-on response time. According to an aspect of the disclosure, the sensor-on response time is a delay from a beginning of the first portion of the repeated timing pattern to a time at which the light sensor is actually turned on. Like the light emitters, the ALS sensor is a physical device and may also have a response time. In particular, there may be a response time, or delay, between the moment the ALS enable signal 1106 transitions from LOW to HIGH and when the ALS sensor actually begins collecting photons to generate an ALS reading (referred to here as the "ALS-ON response time"). The enable blanking period 1112 may be adjusted to take advantage of this delay in the activation of the ALS sensor. Here, the ALS-ON response time tends to decrease the duration of the enable blanking period 1112.

In another aspect of the disclosure, the repeated timing pattern includes one or more enable overlap periods 1114 during which both the one or more light emitters and the light sensor are enabled. The existence of response times for turning ON the emitters and/or turning OFF the ALS sensor can allow an overlap of enable signals. For example, each of the one or more enable overlap periods is formed by an overlap of an ending part of the first portion of the repeated timing pattern and a beginning part of the second portion of the repeated timing pattern. Here, each of the one or more enable overlap periods 1114 may be based on a display-on response time associated with the one or more light emitters. In addition, the one or more enable overlap periods 1114 may further be based on parameters other than the display-on response time. According to an aspect of the disclosure, the display-on response time is a delay from a beginning of the second portion of the repeated timing pattern to a time at which the one or more light emitters are actually turned on. There may be a response time, or delay, between the moment the display enable signal 1104 transitions from LOW to HIGH and when the light emitters of the display panel actually turn on (referred to here as the "display-ON response time"). Taking advantage of this delay, the display enable signal 1104 can transition from LOW to HIGH before the ALS enable signal 1106 transitions from HIGH to LOW, which introduces an overlap of the HIGH states of the display enable signal 1104 and the ALS enable signal 1106. Here, the display-ON response time tends to increase the duration of the enable overlap period 1114. While the enable overlap period 1114 represents a time region in which the HIGH state of the display enable signal 1104 slightly overlaps with the HIGH state of the ALS enable signal 1106, the duration of the overlap is relatively short. Even when such a slight overlap exists, the HIGH state of the display enable signal 1104 and the HIGH state of the ALS enable signal 1106 still do not substantially overlap with one another.

Each of the one or more enable overlap periods 1114 may further be based on a sensor-off response time associated with the light sensor. In addition, the one or more enable overlap periods 1114 may further be based on parameters other than the sensor-off response time. According to an aspect of the disclosure, the sensor-off response time is a delay from an end of the first portion of the repeated timing pattern to a time at which the light sensor is actually turned off. There may be a response time, or delay, between the moment the ALS enable signal 1106 transitions from HIGH to LOW and when the ALS sensor actually stops collecting photons for an ALS reading (referred to here as the "ALS-OFF response time"). The enable overlap period 1114 may be adjusted to accommodate such a delay, to ensure that the ALS sensor has actually stopped collecting photons for an ALS reading before the emitters of the display panel are turned on. Here, the ALS-OFF response time tends to decrease the duration of the enable overlap period 1114. In one implementation, the enable blanking period 1112 and the enable overlap period 1114 may be computed as:

$$\text{Enable Blanking Period} = \qquad\qquad\qquad\quad (\text{Eq. 4})$$
$$(display - OFF\ Response\ Time - ALS - ON\ Response\ Time)$$
$$\text{Enable Overlap Period} = \qquad\qquad\qquad\quad (\text{Eq. 5})$$
$$(display - ON\ Response\ Time - ALS - OFF\ Response\ Time)$$

Figure 12:
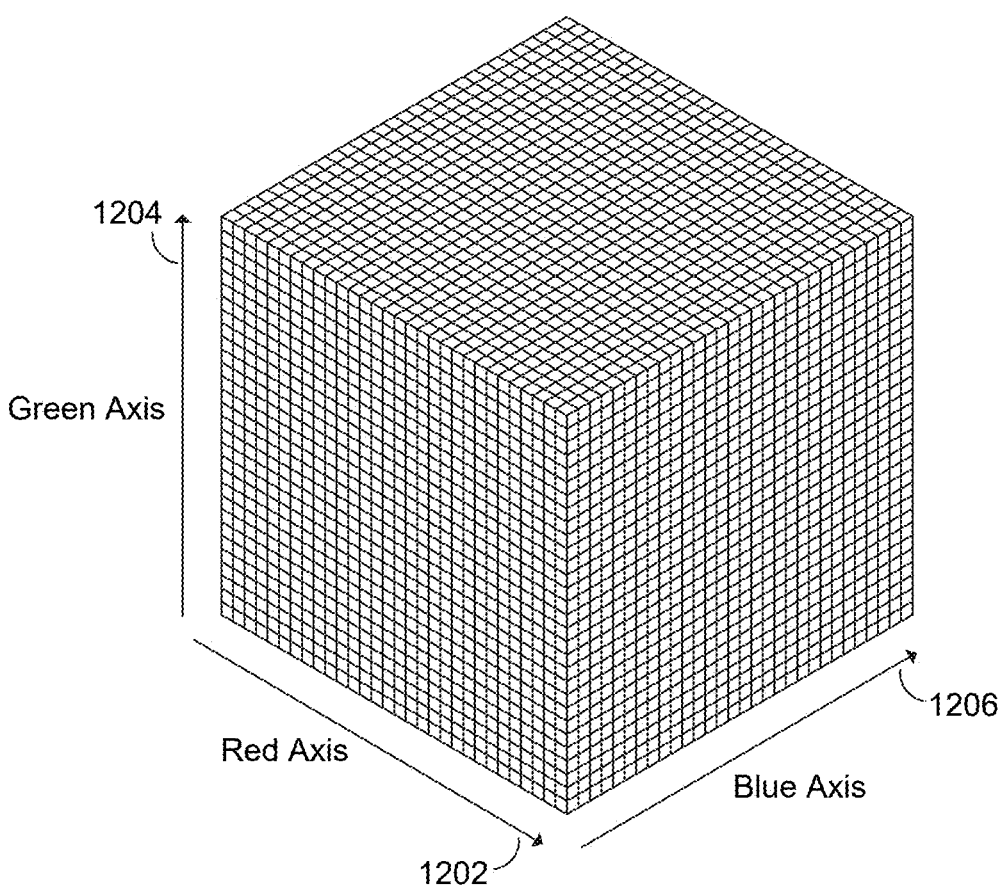
FIG. 12 is a three-dimensional (3D) lookup table (LUT) used for mapping input red, green, and blue (RBG) color values to output RGB color values.

FIG. 12 is a three-dimensional (3D) lookup table (LUT) used for mapping input red, green, and blue (RBG) color values to output RGB color values. According to certain aspects of the disclosure, the technique for coordinated emission of display light and sensing of ambient light intensity further comprises (1) selecting a color mapping data structure (e.g., a 3D LUT) based on the duty cycle for sensing ambient light within the repeated timing pattern and (2) using the selected color mapping data structure to apply a color shift by mapping input display color values to output display color values for one or more frames of display content. Modern displays such as OLED displays can incorporate 3D LUTs, to map input color values to output color values in order take into account the particular color characteristics of the display panel. FIG. 12 shows a 3D LUT 1200 based on an RGB color architecture and comprises mapped color values organized in a data structure indexed along three axes, a red (R) axis 1202, a green (G) axis 1204, and a blue (B) axis 1206. The three-dimensional space occupied by the 3D LUT defines a color gamut of all possible input RGB values. Each entry in the 3D LUT corresponds to a mapping of an input RGB value to an output RGB value. The input RGB value is the three-dimensional index or address (i.e., x, y, and z coordinate value) reflecting the location of the entry within the 3D LUT. The output RGB value is the value stored as the entry at that particular three-dimensional index or address of the 3D LUT. By using the input RGB value as the index into the 3D LUT, the corresponding output RGB value can be retrieved by reading out the stored entry value. The 3D LUT thus defines the color transfer function for all possible input RGB color values within the color gamut supported by the three-dimensional data structure. The 3D LUT may fully or partially occupy the three-dimensional space spanned by the three axes 1202, 1204, and 1206. While the RGB color architecture is illustrated here, other color scheme such as a red, green, green, and blue (RGGB) color architecture, a cyan, magenta, yellow, and black (CMYB) color architecture, can be implemented as well.

Adjusting the display duty cycle (i.e., time duration of the display sub-pixels being turned on) can introduce significant shifts in the color and/or brightness characteristics of sub-pixels in the display panel. With respect to the color shift, aspects of the present disclosure employs a different 3D LUT 1200 for each display duty cycle or range of display duty cycle, in order to compensate for any display duty cycle-dependent color shift that might occur. FIG. 13A illustrates examples of different display duty cycles and their corresponding color calibration parameters. As shown, a color shift compensation table 1302 comprises entries indicating that a display duty cycle of 20% may correspond to a color calibration parameter value of 0, which may in turn correspond to a particular 3D LUT (e.g., 3D LUT 0). A display duty cycle of 50% may correspond to a color calibration parameter of 1, which may in turn correspond to another 3D LUT (e.g., 3D LUT 1). A display duty cycle of 70% may correspond to a color calibration parameter of 2, which may in turn correspond to yet another 3D LUT (e.g., 3D LUT 2). Here, the color calibration parameters of 0, 1, and 2 may in turn correspond to different 3D LUTs. Thus, the color shift compensation table 1302 compensates for different color shifts that are dependent the display duty cycle.

FIG. 13B illustrates examples of different display duty cycle ranges and their corresponding color calibration parameters. Here, a similar operation is performed. However, instead of mapping specific display duty cycles to associated 3D LUTs, the table maps ranges of display duty cycles to associated 3D LUTs. As shown, a color shift compensation table 1304 comprises entries indicating that a display duty cycle range of 0%-35% may correspond to a color calibration parameter value of 0. A display duty cycle range of 35%-65% may correspond to a color calibration parameter value of 1. A display duty cycle range of 65%-100% may correspond to a color calibration parameter value of 2. Once again, the color calibration parameters of 0, 1, and 2 may in turn correspond to different 3D LUTs. Any display duty cycle from 0% to 100% may be identified as belonging to one of the designated display duty cycle ranges, and a corresponding 3D LUT can be selected. Storage of a large number of 3D LUTs can be memory intensive. By defining ranges, the implementation shown in FIG. 13B allows a fewer number of 3D LUTs to be used, one for each range of display duty cycle.

With respect to the color shift, aspects of the present disclosure employs a different brightness adjustment ratio for each display duty cycle or range of display duty cycle, in order to compensate for any display duty cycle-dependent brightness shift that might occur. FIG. 14A illustrates examples of different display duty cycles and their corresponding brightness level adjustment ratio. As shown, a brightness shift compensation table 1402 comprises entries indicating that a display duty cycle of 20% may correspond to a brightness level adjustment ratio of 3. A display duty cycle of 50% may correspond to a brightness level adjustment ratio of 2. A display duty cycle of 70% may correspond to a brightness level adjustment ratio of 0.8. Here, the adjustment ratios of 3, 2, and 0.8 are illustrative scalar values used to as multipliers to modify the brightness level of the display. Thus, the brightness shift compensation table 1402 compensates for different brightness level shifts that are dependent the display duty cycle.

FIG. 14B illustrates examples of different display duty cycle ranges and their corresponding brightness adjustment ratios. Here, a similar operation is performed. However, instead of mapping specific display duty cycles to associated brightness adjustment ratios, the table maps ranges of display duty cycles to associated brightness adjustment ratios. As shown, a brightness shift compensation table 1404 comprises entries indicating that a display duty cycle range of 0%-35% may correspond to a brightness adjustment ratio of 3. A display duty cycle range of 35%-65% may correspond to a brightness adjustment ratio of 2. A display duty cycle range of 65%-100% may correspond to a brightness adjustment ratio of 0.8. Again, any display duty cycle from 0% to 100% may be identified as belonging to one of the designated display duty cycle ranges, and a corresponding brightness adjustment ratio can be selected. By defining ranges, the implementation shown in FIG. 14B allows a fewer number of brightness adjustment ratios to be used, one for each range of display duty cycle.

According to an aspect of the disclosure, various techniques for coordinating the emission of display light and the measurement of ambient light intensity may involve a light sensor positioned beneath the one or more light emitters from a perspective of a user of the display device. Referring back to FIG. 2, for example, the ALS device 214 is positioned beneath one or more light emitters 212 of the OLED display panel 204. According to another aspect of the disclosure, various techniques for coordinating the emission of display light and the measurement of ambient light intensity may involve a light sensor positioned side-by-side with the one or more light emitters from the perspective of the user of the display device. While not shown in the figures, such an arrangement may involve a combined display and light sensor panel comprised of a plurality of compound pixels. Each compound pixel may comprise, for example, a collection of light emitting sub-pixels (e.g., a red sub-pixel, a green sub-pixel, and a blue sub-pixel) as well as a light sensing sub-pixel (e.g., an ALS device). In such a manner, the ALS device may be positioned side-by-side with the one or light emitters. Techniques described here for controlling the timing of light emission and light sensing, e.g., using a time division duplexing (TDD) timing structure, may be implemented to prevent display light emanating from the one or more light emitters from positively biasing the ambient light intensity measurement obtained by the ALS device.

In a further aspect of the disclosure, a display panel such as the OLED display panel 204 may be partitioned into multiple regions, including a first region and a second region. The first region may comprise light emitters proximate to the light sensor, while the second region may comprise light emitters not proximate to the light sensor. For example, the first region of the OLED display panel 204 may comprise individual OLED sub-pixels 212 (light emitters) proximate to the ALS device 214, and the second region may comprise individual OLED sub-pixels 206 (light emitters) not proximate to the ALS device 214 (e.g., the rest of the light emitters in the OLED display panel 204). For instance, the OLED sub-pixels 212 (light emitters) may be positioned such that an optical path exists between the ALS device 214 and the OLED sub-pixels 212 (light emitters). By contrast, the OLED sub-pixels 206 (light emitters) may be positioned such that no optical path exists between the ALS device 214 and the OLED sub-pixels 206 (light emitters). A first repeated timing pattern may be used for controlling light emitters in the first region. A second repeated timing pattern may be used for controlling light emitters in the second region. In one implementation, the first repeated timing pattern may utilize a TDD structure to ensure that the display duty cycle does not substantially overlap the ALS duty cycle, while the second repeated timing pattern may utilize no TDD structure and instead maximize the display duty cycle with no duty cycle designated for ALS sensing. In another implementation, the first repeated timing pattern may utilize a first TDD structure to ensure that the display duty cycle does not substantially overlap the ALS duty cycle, with a higher emphasis on the ALS duty cycle. The second repeated timing pattern may utilize a second TDD structure that also ensures the display duty cycle does not substantially overlap the ALS duty cycle, but with a lower emphasis on the ALS duty cycle as compared to the first TDD structure.

FIG. 15 is a flow chart showing examples of steps performed in a technique for sensing ambient light intensity while presenting display content, according to an aspect of the disclosure. In a step 1502, a light sensor is positioned in proximity to one or more light emitters, the one or more light emitters forming at least a portion of a display device. An example of the light sensor is the ALS device 214, and examples of the one or more light emitters are light emitters 212, as shown in FIG. 2. Means for positioning the light sensor in proximity to the one or more light emitters include, for example, the user device 200 comprising the stacked structure including the protective glass layer 202, the organic light-emitting diode (OLED) panel 204 that comprises the plurality of individual OLED sub-pixels 206, the printed circuit board (PCB) 208, and the chassis 210, all shown in FIG. 2.

In a step 1504, one or more timing signals are provided to (1) enable the light sensor to sense ambient light during a first portion of a repeated timing pattern and (2) enable the one or more light emitters to emit display light during a second portion of the repeated timing pattern. According to this aspect of the disclosure, the first portion does not substantially overlap with the second portion of the repeated timing pattern. Furthermore, the first portion of the repeated timing pattern corresponds to a duty cycle for sensing ambient light within the repeated timing pattern, and the second portion of the repeated timing pattern corresponds to a duty cycle for emitting display light within the repeated timing pattern. Means for providing one or more timing signals to enable the light sensor to sense ambient light during the first portion of the repeated timing pattern and enable the one or more light emitters to emit display light during the second portion of the repeated timing pattern include, for example, the TDD timing controller IC 308, the TDD timing controller module 408 implemented within the SOC 410, and TDD timing controller 506 implemented within the combined DDIC and ALS controller 504, as shown in FIGS. 3, 4, and 5, respectively.

In a step 1506, an ambient light intensity measurement is generated based on one or more readings of the light sensor. Means for generating the ambient light intensity measurement include, for example, the ALS device 214 shown in FIG. 2. In a step 1508, the duty cycle for sensing ambient light within the repeated timing pattern is adjusted, in response to the ambient light intensity measurement. Means for adjusting the duty cycle for sensing ambient light within the repeated timing pattern include, for example, the TDD timing controller IC 308, the TDD timing controller module

408 implemented within the SOC 410, and TDD timing controller 506 implemented within the combined DDIC and ALS controller 504, as shown in FIGS. 3, 4, and 5, respectively.

Figure 16:
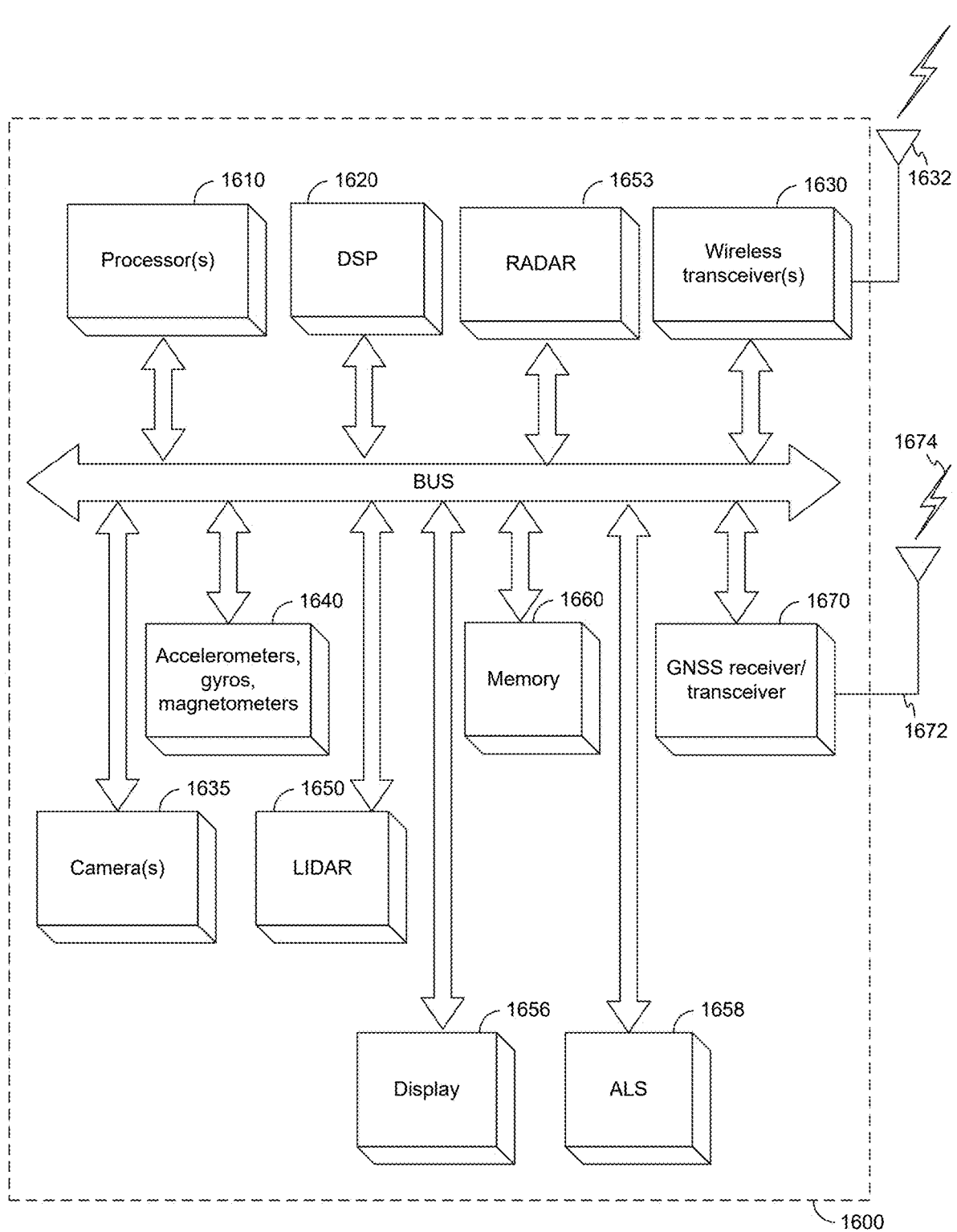
FIG. 16 is a block diagram of various hardware and software components of a device employing a display and an ALS sensor capable coordinated emission of display content and capturing of ambient light for ALS measurement, according to an aspect of the disclosure.

FIG. 16 is a block diagram of various hardware and software components of a device 1600 employing a display and an ALS sensor capable coordinated emission of display content and capturing of ambient light for ALS measurement, according to an aspect of the disclosure. An example of device 1600 may be an environment monitoring device, a mobile handset device, a wearable device, a vehicle, a drone, or another device taking image data as input. In one example, device 1600 may communicate, via wireless transceiver(s) 1630 and wireless antenna(s) 1632 with other devices and/or wireless communication networks by transmitting wireless signals to, or receiving wireless signals from a remote wireless transceiver which may comprise another device, a base station (e.g., a NodeB, eNodeB, or gNodeB) or wireless access point, over a wireless communication link.

Similarly, device 1600 may transmit wireless signals to, or receive wireless signals from a local transceiver over a wireless communication link, for example, by using a WLAN and/or a PAN wireless transceiver, here represented by one of wireless transceiver(s) 1630 and wireless antenna(s) 1632. In an aspect, wireless transceiver(s) 1630 may comprise various combinations of WAN, WLAN, and/or PAN transceivers. In an aspect, wireless transceiver(s) 1630 may also comprise a Bluetooth transceiver, a ZigBee transceiver, or other PAN transceiver. In an aspect, device 1600 may transmit wireless signals to, or receive wireless signals from a wireless transceiver 1630 on a device 1600 over wireless communication link 1634. A local transceiver, a WAN wireless transceiver and/or a mobile wireless transceiver may comprise a WAN transceiver, an access point (AP), femtocell, Home Base Station, small cell base station, HNB, HeNB, or gNodeB and may provide access to a wireless local area network (WLAN, e.g., IEEE 802.11 network), a wireless personal area network (PAN, e.g., Bluetooth network) or a cellular network (e.g., an LTE network or other wireless wide area network such as those discussed in the next paragraph). Of course, it should be understood that these are merely examples of networks that may communicate with a device over a wireless link, and claimed subject matter is not limited in this respect. It is also understood that wireless transceiver(s) 1630 may be located on various types of devices 1600, such as boats, ferries, cars, buses, drones, and various transport vehicles. In an aspect, the device 1600 may be utilized for passenger transport, package transport or other purposes. In an aspect, GNSS signals 1674 from GNSS Satellites are utilized by device 1600 for location determination and/or for the determination of GNSS signal parameters and demodulated data. In an aspect, signals 1634 from WAN transceiver(s), WLAN and/or PAN local transceivers are used for location determination, alone or in combination with GNSS signals 1674.

Examples of network technologies that may support wireless transceivers 1630 are GSM, CDMA, WCDMA, LTE, 5G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the 3rd Generation Partnership Project II (3GPP2). WCDMA is also part of the Universal Mobile Telecommunications System (UMTS) and may be supported by an HNB.

Wireless transceivers 1630 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 5G NR base stations. In an aspect, further wireless base stations may comprise a WLAN and/or PAN transceiver.

In an aspect, device 1600 may contain one or more cameras 1635, which may comprise an image capture apparatus capable of capturing an expanded field of view according to various aspects of the present disclosure. In an aspect, the camera may comprise a camera sensor and mounting assembly. Different mounting assemblies may be used for different cameras on device 1600. The cameras may provide object detection and distance estimation, particularly for objects of known size and/or shape. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system.

Accelerometers, gyros, and magnetometers 1640, in an aspect, may be utilized to provide and/or verify motion and directional information. LIDAR 1650 uses pulsed laser light to measure ranges to objects. While cameras may be used for object detection, LIDAR 1650 provides a means, to detect the distances (and orientations) of the objects with more certainty, especially in regard to objects of unknown size and shape. LIDAR 1650 measurements may also be used to estimate rate of travel, vector directions, relative position and stopping distance by providing accurate distance measurements and delta distance measurements.

Memory 1660 may be utilized with processor 1610 and/or DSP 1620, which may comprise Random Access Memory (RAM), Read-Only Memory (ROM), disc drive, FLASH, or other memory devices or various combinations thereof. In an aspect, memory 1660 may contain instructions to implement various methods described throughout this description. In an aspect, memory may contain instructions for operating and calibrating sensors, and for receiving map, weather, and other data.

A global navigation satellite system (GNSS) receiver 1670 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver/transceiver/transceiver 1670, may receive RF signals 1674 from GNSS satellites using one or more antennas 1672 (which, depending on functional requirements, may be the same as antenna(s) 1632). The GNSS receiver/transceiver/transceiver 1670 may support one or more GNSS constellations as well as other satellite-based navigation systems. For example, in an aspect, GNSS receiver/transceiver/transceiver 1670 may support global navigation satellite systems such as GPS, the GLONASS, Galileo, and/or BeiDou, or any combination thereof. In an aspect, GNSS receiver/transceiver 1670 may support regional navigation satellite systems such as NavIC or QZSS or a combination thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multifunctional satellite augmentation system (MSAS) or the local area augmentation system (LAAS). In an aspect, GNSS receiver/transceiver(s) 1630 and antenna(s) 1632 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver/transceiver 1670 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an aspect, GNSS-based relative locations, based on, for example shared Doppler and/or pseudorange measurements between vehicles, may be used to determine highly accurate distances between two vehicles, and when combined with vehicle information such as shape and model information and GNSS antenna location, may be used to calibrate, validate, and/or affect the confidence level associated with information from LIDAR, camera, RADAR, SONAR, and other distance estimation techniques.

RADAR 1653, uses transmitted radio waves that are reflected off of objects. The reflected radio waves are analyzed, based on the time taken for reflections to arrive and other signal characteristics of the reflected waves to determine the location of nearby objects. RADAR 1653 may be utilized to detect the location of nearby cars, roadside objects (signs, other vehicles, pedestrians, etc.) and will generally enable detection of objects even if there is obscuring weather such as snow, rain, or hail. Thus, RADAR 1653 may be used to complement LIDAR 1650 systems and camera 1635 systems in providing ranging information to other objects by providing ranging and distance measurements and information when visual-based systems typically fail. Furthermore, RADAR 1653 may be utilized to calibrate and/or sanity check other systems such as LIDAR 1650 and camera 1635.

In an aspect, device 1600 may contain a display 1656. The display 1656 may comprise, for example, an organic light-emitting diode (OLED) panel comprising a plurality of OLED sub-pixels, a display driver integrated circuit (DDIC) comprising row drivers and column drivers for providing appropriate driving signals to present display content by turning on individual sub-pixels of the display panel for appropriate durations at specified color and brightness levels. In an aspect, device 1600 may contain an ambient light sensor (ALS) device 1658. The ALS device 1658 may comprise one or more photodiodes for converting photons of light into an electrical signal. The photons of light may correspond to ambient light from the environment. The ALS device 1658 may further comprise a lowpass filter (LPF) for filtering out noise and high-frequency components of the electrical signal. The ALS device 1658 may further comprise an analog-to-digital converter (ADC) to convert the filtered electrical signal into a digital signal. The ALS device 1658 may further comprise an output buffer for storing initial, intermediate, and/or final results derived from raw, accumulated, or otherwise processed versions of the digital signal, as a measure of the intensity of ambient light sensed by the ALS device 1658.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., memory 1660 of FIG. 16) can include non-transitory machine-readable media. The term "machine-readable medium" and "computer-readable medium" as used herein, refer to any storage medium that participates in providing data that causes a machine to operate in a specific fashion. In aspects provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various aspects may omit, substitute, or add various procedures or components as appropriate. For instance, features described with respect to certain aspects may be combined in various other aspects. Different aspects and elements of the aspects may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. The term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several aspects, various modifications, alternative constructions, and equivalents may be used without departing from the spirit of the disclosure. For example, the above elements may merely be a component of a larger system, wherein other rules may take precedence over or otherwise modify the application of the various aspects. Also, a number of steps may be undertaken before, during, or after the above elements are considered. Accordingly, the above description does not limit the scope of the disclosure.

In view of this description aspects may include different combinations of features. Implementation examples are described in the following numbered clauses.

Clause 1. A user equipment comprising: a display device, the display device comprising one or more light emitters forming at least a portion of the display device; a light sensor positioned such that an optical path exists between the light sensor and the one or more light emitters; and a timing controller coupled to the light sensor and the display device, the timing controller configured to provide one or more timing signals to (1) enable the light sensor to sense ambient light during a first portion of a repeated timing pattern and (2) enable the one or more light emitters to emit display light during a second portion of the repeated timing pattern, wherein the first portion does not substantially overlap with the second portion of the repeated timing pattern, wherein the first portion of the repeated timing pattern corresponds to a duty cycle for sensing ambient light within the repeated timing pattern, and the second portion of the repeated timing pattern corresponds to a duty cycle for emitting display light within the repeated timing pattern, wherein the timing controller is configured to adjust the duty cycle for sensing ambient light within the repeated timing pattern and the duty cycle for emitting display light within the repeated timing pattern, in response to an ambient light intensity measurement based on one or more readings of the light sensor, and wherein the timing controller is configured to continue to provide the one or more timing signals after adjusting the duty cycle for sensing ambient light within the repeated timing pattern.

Clause 2. The user equipment of clause 1, wherein the first portion does not substantially overlap with the second portion of the repeated timing pattern means: the first portion and the second portion ensure that no display light is emitted from the one or more light emitters when the light sensor is operating to sense ambient light.

Clause 3. The user equipment of any one of clauses 1-2 wherein the user equipment further comprises a controller for the light sensor, a controller for the light sensor, and a processor coupled to the light sensor and the display device, wherein the timing controller is implemented as a semiconductor device separate from the controller for the light sensor, the controller for the display device, and the processor.

Clause 4. The user equipment of any one of clauses 1-2 wherein the user equipment further comprises a processor coupled to the light sensor and the display device, and the timing controller is implemented within the processor.

Clause 5. The user equipment of any one of clauses 1-2 wherein the timing controller is implemented as a combined timing controller for the light sensor and the display device.

Clause 6. The user equipment of any one of clauses 1-5 wherein the one or more timing signals comprise (1) a first timing signal to enable the light sensor to sense ambient light during the first portion of the repeated timing pattern and (2) a second timing signal, different from the first timing signal, to enable the one or more light emitters to emit display light during the second portion of the repeated timing pattern.

Clause 7. The user equipment of any one of clauses 1-5 wherein the one or more timing signals comprise a common timing signal to enable the light sensor to sense ambient light during the first portion of the repeated timing pattern and enable the one or more light emitters to emit display light during the second portion of the repeated timing pattern.

Clause 8. The user equipment of any one of clauses 1-7 further comprising one or more buffers configured to store digital values, and wherein the ambient light intensity measurement is generated based on using the buffer to store digitally accumulated light intensity values from the light sensor across one or more exposures of the light sensor.

Clause 9. The user equipment of any one of clauses 1-7 further comprising one or more charge storage circuits, and wherein the ambient light intensity measurement is generated based on using the one or more charge storage circuits to accumulate analog signals from the light sensor across one or more exposures of the light sensor.

Clause 10. The user equipment of any one of clauses 1-9 wherein the timing controller is configured to increase the duty cycle for sensing ambient light within the repeated timing pattern in response to a decrease in the ambient light intensity measurement.

Clause 11. The user equipment of any one of clauses 1-9 wherein the timing controller is configured to decrease the duty cycle for sensing ambient light within the repeated timing pattern in response to an increase in the ambient light intensity measurement.

Clause 12. The user equipment of any one of clauses 1-11 wherein the repeated timing pattern includes one or more enable blanking periods during which both the one or more light emitters and the light sensor are disabled, wherein each of the one or more enable blanking periods is located between an end of the second portion of the repeated timing pattern and a beginning of the first portion of the repeated timing pattern.

Clause 13. The user equipment of clause 12 wherein each of the one or more enable blanking periods is based on a display-off response time associated with the one or more light emitters, wherein the display-off response time is a delay from the end of the second portion of the repeated timing pattern to a time at which the one or more light emitters are actually turned off.

Clause 14. The user equipment of clause 13 wherein each of the one or more enable blanking periods is further based on a sensor-on response time associated with the light sensor, wherein the sensor-on response time is a delay from a beginning of the first portion of the repeated timing pattern to a time at which the light sensor is actually turned on.

Clause 15. The user equipment of any one of clauses 1-14 wherein the repeated timing pattern includes one or more enable overlap periods during which both the one or more light emitters and the light sensor are enabled, wherein each of the one or more enable overlap periods is formed by an overlap of an ending part of the first portion of the repeated timing pattern and a beginning part of the second portion of the repeated timing pattern.

Clause 16. The user equipment of clause 15 wherein each of the one or more enable overlap periods is based on a display-on response time associated with the one or more light emitters, wherein the display-on response time is a delay from a beginning of the second portion of the repeated timing pattern to a time at which the one or more light emitters are actually turned on.

Clause 17. The user equipment of clause 16 wherein each of the one or more enable overlap periods is further based on a sensor-off response time associated with the light sensor, wherein the sensor-off response time is a delay from an end of the first portion of the repeated timing pattern to a time at which the light sensor is actually turned off.

Clause 18. The user equipment of any one of clauses 1-17 further comprising a processor coupled to the display device, wherein the processor is configured to: select a color mapping data structure based on the duty cycle for sensing ambient light within the repeated timing pattern; and use the selected color mapping data structure to apply a color shift by mapping input display color values to output display color values for one or more frames of display content.

Clause 19. The user equipment of clause 18 wherein the color mapping data structure comprises a three-dimensional (3D) lookup table (LUT).

Clause 20. The user equipment of any one of clauses 1-19 further comprising a processor coupled to the display device, wherein the processor is configured to: select a brightness adjustment value based on the duty cycle for sensing ambient light within the repeated timing pattern; and use the brightness adjustment value to apply a brightness shift for one or more frames of display content.

Clause 21. The user equipment of any one of clauses 1-20 wherein the light sensor is positioned beneath the one or more light emitters from a perspective of a user of the display device.

Clause 22. The user equipment of any one of clauses 1-20 wherein the light sensor is positioned side-by-side with the one or more light emitters from a perspective of a user of the display device.

Clause 23. The user equipment of any one of clauses 1-22 wherein the one or more light emitters are part of a first region of the display device, and the display device further comprises one or more additional light emitters as part of a second region of the display device, and wherein the timing controller is further configured to provide one or more timing signals in a second repeated timing pattern to enable the light sensor to sense ambient light while simultaneously enabling the one or more additional light emitters in the second region of the display device to emit display light.

Clause 24. A method of sensing ambient light intensity in a user equipment comprising a display device and a light sensor positioned such that an optical path exists between the light sensor and one or more light emitters forming at least a portion of the display device, the method comprising: providing one or more timing signals to (1) enable the light sensor to sense ambient light during a first portion of a repeated timing pattern and (2) enable the one or more light emitters to emit display light during a second portion of the repeated timing pattern, wherein the first portion does not substantially overlap with the second portion of the repeated timing pattern, and wherein the first portion of the repeated timing pattern corresponds to a duty cycle for sensing ambient light within the repeated timing pattern, and the second portion of the repeated timing pattern corresponds to a duty cycle for emitting display light within the repeated timing pattern, and generating an ambient light intensity measurement based on one or more readings of the light sensor; adjusting the duty cycle for sensing ambient light within the repeated timing pattern and the duty cycle for emitting display light within the repeated timing pattern, in response to the ambient light intensity measurement; and continuing to provide the one or more timing signals after adjusting the duty cycle for sensing ambient light within the repeated timing pattern.

Clause 25. The method of clause 24, wherein the first portion does not substantially overlap with the second portion of the repeated timing pattern means: the first portion and the second portion ensure that no display light is emitted from the one or more light emitters when the light sensor is operating to sense ambient light.

Clause 26. The method of any one of clauses 24-25 wherein the one or more timing signals are provided by a semiconductor device separate from a controller for the light sensor, a controller for the display device, and a processor coupled to the light sensor and the display device.

Clause 27. The method of any one of clauses 24-25 wherein the one or more timing signals are provided by a processor coupled to the light sensor and the display device.

Clause 28. The method of any one of clauses 24-25 wherein the one or more timing signals are provided by a combined timing controller for the light sensor and the display device.

Clause 29. The method of any one of clauses 24-28 wherein the one or more timing signals comprise (1) a first timing signal to enable the light sensor to sense ambient light during the first portion of the repeated timing pattern and (2) a second timing signal, different from the first timing signal, to enable the one or more light emitters to emit display light during the second portion of the repeated timing pattern.

Clause 30. The method of any one of clauses 24-28 wherein the one or more timing signals comprise a common timing signal to enable the light sensor to sense ambient light during the first portion of the repeated timing pattern and enable the one or more light emitters to emit display light during the second portion of the repeated timing pattern.

Clause 31. The method of any one of clauses 24-30 wherein the ambient light intensity measurement is generated based on digitally accumulating light intensity values from the light sensor across one or more exposures of the light sensor.

Clause 32. The method of any one of clauses 24-30 wherein the ambient light intensity measurement is generated based on accumulating analog signals from the light sensor across one or more exposures of the light sensor.

Clause 33. The method of any one of clauses 24-32 wherein the duty cycle for sensing ambient light within the repeated timing pattern is increased, in response to a decrease in the ambient light intensity measurement.

Clause 34. The method of any one of clauses 24-32 wherein the duty cycle for sensing ambient light within the repeated timing pattern is decreased, in response to an increase in the ambient light intensity measurement.

Clause 35. The method of any one of clauses 24-34 wherein the repeated timing pattern includes one or more enable blanking periods during which both the one or more light emitters and the light sensor are disabled, wherein each of the one or more enable blanking periods is located between an end of the second portion of the repeated timing pattern and a beginning of the first portion of the repeated timing pattern.

Clause 36. The method of clause 35 wherein each of the one or more enable blanking periods is based on a display-off response time associated with the one or more light emitters, wherein the display-off response time is a delay from the end of the second portion of the repeated timing pattern to a time at which the one or more light emitters are actually turned off.

Clause 37. The method of clause 36 wherein each of the one or more enable blanking periods is further based on a sensor-on response time associated with the light sensor, wherein the sensor-on response time is a delay from a beginning of the first portion of the repeated timing pattern to a time at which the light sensor is actually turned on.

Clause 38. The method of any one of clauses 24-37, wherein the repeated timing pattern includes one or more enable overlap periods during which both the one or more light emitters and the light sensor are enabled, wherein each of the one or more enable overlap periods is formed by an overlap of an ending part of the first portion of the repeated timing pattern and a beginning part of the second portion of the repeated timing pattern.

Clause 39. The method of clause 38, wherein each of the one or more enable overlap periods is based on a display-on response time associated with the one or more light emitters, wherein the display-on response time is a delay from a beginning of the second portion of the repeated timing pattern to a time at which the one or more light emitters are actually turned on.

Clause 40. The method of clause 39 wherein each of the one or more enable overlap periods is further based on a sensor-off response time associated with the light sensor, wherein the sensor-off response time is a delay from an end of the first portion of the repeated timing pattern to a time at which the light sensor is actually turned off.

Clause 41. The method of any one of clauses 24-40 further comprising selecting a color mapping data structure based on the duty cycle for sensing ambient light within the repeated timing pattern; and using the selected color mapping data structure, applying a color shift by mapping input display color values to output display color values for one or more frames of display content.

Clause 42. The method of clause 41 wherein the color mapping data structure comprises a three-dimensional (3D) lookup table (LUT).

Clause 43. The method of any one of clauses 24-42 further comprising selecting a brightness adjustment value based on the duty cycle for sensing ambient light within the repeated timing pattern; and using the brightness adjustment value, applying a brightness shift for one or more frames of display content.

Clause 44. The method of any one of clauses 24-43 wherein the light sensor is positioned beneath the one or more light emitters from a perspective of a user of the display device.

Clause 45. The method of any one of clauses 24-43 wherein the light sensor is positioned side-by-side with the one or more light emitters from a perspective of a user of the display device.

Clause 46. The method of any one of clauses 24-45, wherein the one or more light emitters are part of a first region of the display device, and the display device further comprises one or more additional light emitters as part of a second region of the display device, and wherein the method further comprises providing one or more timing signals in a second repeated timing pattern to enable the light sensor to sense ambient light while simultaneously enabling the one or more additional light emitters in the second region of the display device to emit display light.

Clause 47. A non-transitory computer-readable medium having instructions embedded thereon, which, when executed by one or more processors, cause the one or more processors to perform functions comprising: provide one or more timing signals to (1) enable a light sensor to sense ambient light during a first portion of a repeated timing pattern and (2) enable one or more light emitters to emit display light during a second portion of the repeated timing pattern, wherein the light sensor is positioned such that an optical path exists between the light sensor and the one or more light emitters, and wherein the first portion of the repeated timing pattern does not substantially overlap with the second portion of the repeated timing pattern, and wherein the first portion of the repeated timing pattern corresponds to a duty cycle for sensing ambient light within the repeated timing pattern, and the second portion of the repeated timing pattern corresponds to a duty cycle for emitting display light within the repeated timing pattern; generate an ambient light intensity measurement based on one or more readings of the light sensor; adjust the duty cycle for sensing ambient light within the repeated timing pattern, in response to the ambient light intensity measurement; and continue to provide the one or more timing signals after adjusting the duty cycle for sensing ambient light within the repeated timing pattern.

Clause 48. A computerized apparatus comprising: means for providing one or more timing signals to (1) enable a light sensor to sense ambient light during a first portion of a repeated timing pattern and (2) enable one or more light emitters to emit display light during a second portion of the repeated timing pattern, wherein the light sensor is positioned such that an optical path exists between the light sensor and the one or more light emitters, and wherein the first portion does not substantially overlap with the second portion of the repeated timing pattern, and wherein the first portion of the repeated timing pattern corresponds to a duty cycle for sensing ambient light within the repeated timing pattern, and the second portion of the repeated timing pattern corresponds to a duty cycle for emitting display light within the repeated timing pattern; means for generating an ambient light intensity measurement based on one or more readings of the light sensor; means for adjusting the duty cycle for sensing ambient light within the repeated timing pattern, in response to the ambient light intensity measurement; and means for continuing to provide the one or more timing signals after adjusting the duty cycle for sensing ambient light within the repeated timing pattern.

What is claimed is:

1. A user equipment comprising:
a display device, the display device comprising one or more light emitters forming at least a portion of the display device;
a light sensor positioned such that an optical path exists between the light sensor and the one or more light emitters; and
a timing controller coupled to the light sensor and the display device, the timing controller configured to provide one or more timing signals to (1) enable the light sensor to sense ambient light during a first portion of a repeated timing pattern and (2) enable the one or more light emitters to emit display light during a second portion of the repeated timing pattern, wherein the first portion does not substantially overlap with the second portion of the repeated timing pattern, wherein the first portion of the repeated timing pattern corresponds to a duty cycle for the sensing of the ambient light within the repeated timing pattern, and the second portion of the repeated timing pattern corresponds to a duty cycle for the emitting of the display light within the repeated timing pattern,
wherein the timing controller is configured to adjust the duty cycle for the sensing of the ambient light within the repeated timing pattern and the duty cycle for the emitting of the display light within the repeated timing pattern, in response to an ambient light intensity measurement based on one or more readings of the light sensor, and
wherein the timing controller is configured to continue to provide the one or more timing signals after adjusting the duty cycle for the sensing of the ambient light within the repeated timing pattern;
further comprising a processor coupled to the display device, wherein the processor is configured to:
select a color mapping data structure based on the duty cycle for the sensing of the ambient light within the repeated timing pattern; and
use the selected color mapping data structure to apply a color shift by mapping input display color values to output display color values for one or more frames of display content.

2. The user equipment of claim 1, wherein the first portion does not substantially overlap with the second portion of the repeated timing pattern means:
the first portion and the second portion ensure that no display light is emitted from the one or more light emitters when the light sensor is operating to sense ambient light.

3. The user equipment of claim 1, wherein the processor coupled to the display device is also coupled to the light sensor, and the timing controller is implemented within the processor.

4. The user equipment of claim 1, wherein the timing controller is implemented as a combined timing controller for the light sensor and the display device.

5. The user equipment of claim 1, wherein the one or more timing signals comprise (1) a first timing signal to enable the light sensor to sense ambient light during the first portion of the repeated timing pattern and (2) a second timing signal, different from the first timing signal, to enable the one or more light emitters to emit display light during the second portion of the repeated timing pattern.

6. The user equipment of claim 1, wherein the one or more timing signals comprise a common timing signal to enable the light sensor to sense ambient light during the first portion of the repeated timing pattern and enable the one or more light emitters to emit display light during the second portion of the repeated timing pattern.

7. The user equipment of claim 1, further comprising one or more buffers configured to store digital values, and wherein the ambient light intensity measurement is generated based on using the buffer to store digitally accumulated light intensity values from the light sensor across one or more exposures of the light sensor.

8. The user equipment of claim 1, further comprising one or more charge storage circuits, and wherein the ambient light intensity measurement is generated based on using the one or more charge storage circuits to accumulate analog signals from the light sensor across one or more exposures of the light sensor.

9. The user equipment of claim 1, wherein the timing controller is configured to increase the duty cycle for the sensing of the ambient light within the repeated timing pattern in response to a decrease in the ambient light intensity measurement.

10. The user equipment of claim 1, wherein the timing controller is configured to decrease the duty cycle for the sensing of the ambient light within the repeated timing pattern in response to an increase in the ambient light intensity measurement.

11. The user equipment of claim 1, wherein the repeated timing pattern includes one or more enable blanking periods during which both the one or more light emitters and the light sensor are disabled, wherein each of the one or more enable blanking periods is located between an end of the second portion of the repeated timing pattern and a beginning of the first portion of the repeated timing pattern.

12. The user equipment of claim 11, wherein each of the one or more enable blanking periods is based on a display-off response time associated with the one or more light emitters, wherein the display-off response time is a delay from the end of the second portion of the repeated timing pattern to a time at which the one or more light emitters are actually turned off.

13. The user equipment of claim 12, wherein each of the one or more enable blanking periods is further based on a sensor-on response time associated with the light sensor, wherein the sensor-on response time is a delay from a beginning of the first portion of the repeated timing pattern to a time at which the light sensor is actually turned on.

14. The user equipment of claim 1, wherein the repeated timing pattern includes one or more enable overlap periods during which both the one or more light emitters and the light sensor are enabled, wherein each of the one or more enable overlap periods is formed by an overlap of an ending part of the first portion of the repeated timing pattern and a beginning part of the second portion of the repeated timing pattern.

15. The user equipment of claim 14, wherein each of the one or more enable overlap periods is based on a display-on response time associated with the one or more light emitters, wherein the display-on response time is a delay from a beginning of the second portion of the repeated timing pattern to a time at which the one or more light emitters are actually turned on.

16. The user equipment of claim 15, wherein each of the one or more enable overlap periods is further based on a sensor-off response time associated with the light sensor, wherein the sensor-off response time is a delay from an end of the first portion of the repeated timing pattern to a time at which the light sensor is actually turned off.

17. The user equipment of claim 1, wherein the color mapping data structure comprises a three-dimensional (3D) lookup table (LUT).

18. The user equipment of claim 17, wherein the processor of the display device is further configured to:
   select a brightness adjustment value based on the duty cycle for the sensing of the ambient light within the repeated timing pattern; and
   use the brightness adjustment value to apply a brightness shift for one or more frames of display content.

19. The user equipment of claim 1, wherein the light sensor is positioned beneath the one or more light emitters from a perspective of a user of the display device.

20. The user equipment of claim 1, wherein the light sensor is positioned side-by-side with the one or more light emitters from a perspective of a user of the display device.

21. The user equipment of claim 1,
   wherein the one or more light emitters are part of a first region of the display device, and the display device further comprises one or more additional light emitters as part of a second region of the display device, and
   wherein the timing controller is further configured to provide one or more timing signals in a second repeated timing pattern to enable the light sensor to sense ambient light while simultaneously enabling the one or more additional light emitters in the second region of the display device to emit display light.

22. A method of sensing ambient light intensity in a user equipment comprising a display device and a light sensor positioned such that an optical path exists between the light sensor and one or more light emitters forming at least a portion of the display device, the method comprising:
   providing one or more timing signals to (1) enable the light sensor to sense ambient light during a first portion of a repeated timing pattern and (2) enable the one or more light emitters to emit display light during a second portion of the repeated timing pattern, wherein the first portion does not substantially overlap with the second portion of the repeated timing pattern, and wherein the first portion of the repeated timing pattern corresponds to a duty cycle for the sensing of the ambient light within the repeated timing pattern, and the second portion of the repeated timing pattern corresponds to a duty cycle for the emitting of the display light within the repeated timing pattern, and
   generating an ambient light intensity measurement based on one or more readings of the light sensor;
   adjusting the duty cycle for the sensing of the ambient light within the repeated timing pattern and the duty cycle for the emitting of the display light within the repeated timing pattern, in response to the ambient light intensity measurement;

continuing to provide the one or more timing signals after adjusting the duty cycle for the sensing of the ambient light within the repeated timing pattern;

selecting a color mapping data structure based on the duty cycle for the sensing of the ambient light within the repeated timing pattern; and using the selected color mapping data structure to apply a color shift by mapping input display color values to output display color values for one or more frames of display content.

23. The method of claim 22, wherein the first portion does not substantially overlap with the second portion of the repeated timing pattern means:

the first portion and the second portion ensure that no display light is emitted from the one or more light emitters when the light sensor is operating to sense ambient light.

24. The method of claim 22, wherein the one or more timing signals are provided by a semiconductor device separate from a controller for the light sensor, a controller for the display device, and a processor coupled to the light sensor and the display device.

25. The method of claim 22, wherein the one or more timing signals are provided by a processor coupled to the light sensor and the display device.

26. The method of claim 22, wherein the one or more timing signals are provided by a combined timing controller for the light sensor and the display device.

27. A non-transitory computer-readable medium having instructions embedded thereon, which, when executed by one or more processors, cause the one or more processors to perform functions comprising:

provide one or more timing signals to (1) enable a light sensor to sense ambient light during a first portion of a repeated timing pattern and (2) enable one or more light emitters to emit display light during a second portion of the repeated timing pattern, wherein the light sensor is positioned such that an optical path exists between the light sensor and the one or more light emitters, and wherein the first portion of the repeated timing pattern does not substantially overlap with the second portion of the repeated timing pattern, and wherein the first portion of the repeated timing pattern corresponds to a duty cycle for the sensing of the ambient light within the repeated timing pattern, and the second portion of the repeated timing pattern corresponds to a duty cycle for the emitting of the display light within the repeated timing pattern;

generate an ambient light intensity measurement based on one or more readings of the light sensor;

adjust the duty cycle for the sensing of the ambient light within the repeated timing pattern, in response to the ambient light intensity measurement;

continue to provide the one or more timing signals after adjusting the duty cycle for the sensing of the ambient light within the repeated timing pattern;

select a color mapping data structure based on the duty cycle for the sensing of the ambient light within the repeated timing pattern; and use the selected color mapping data structure to apply a color shift by mapping input display color values to output display color values for one or more frames of display content.

28. A computerized apparatus comprising:

means for providing one or more timing signals to (1) enable a light sensor to sense ambient light during a first portion of a repeated timing pattern and (2) enable one or more light emitters to emit display light during a second portion of the repeated timing pattern, wherein the light sensor is positioned such that an optical path exists between the light sensor and the one or more light emitters, and wherein the first portion does not substantially overlap with the second portion of the repeated timing pattern, and wherein the first portion of the repeated timing pattern corresponds to a duty cycle for the sensing of the ambient light within the repeated timing pattern, and the second portion of the repeated timing pattern corresponds to a duty cycle for the emitting of the display light within the repeated timing pattern;

means for generating an ambient light intensity measurement based on one or more readings of the light sensor;

means for adjusting the duty cycle for the sensing of the ambient light within the repeated timing pattern, in response to the ambient light intensity measurement;

means for continuing to provide the one or more timing signals after adjusting the duty cycle for the sensing of the ambient light within the repeated timing pattern;

means for selecting a color mapping data structure based on the duty cycle for the sensing of the ambient light within the repeated timing pattern; and means for using the selected color mapping data structure to apply a color shift by mapping input display color values to output display color values for one or more frames of display content.

* * * * *